United States Patent
Robinson et al.

(10) Patent No.: US 10,118,833 B2
(45) Date of Patent: Nov. 6, 2018

(54) DIMENSIONALLY FOCUSED NANOPARTICLE SYNTHESIS METHODOLOGY

(71) Applicant: Cornell University, Ithaca, NY (US)

(72) Inventors: Richard D. Robinson, Ithaca, NY (US); Tobias Hanrath, Ithaca, NY (US); Curtis Williamson, Ithaca, NY (US); Douglas Nevers, Ithaca, NY (US)

(73) Assignee: Cornell University, Ithaca, NY (US)

( * ) Notice: Subject to any disclaimer, the term of this patent is extended or adjusted under 35 U.S.C. 154(b) by 11 days.

(21) Appl. No.: 15/516,131

(22) PCT Filed: Oct. 2, 2015

(86) PCT No.: PCT/US2015/053756
§ 371 (c)(1),
(2) Date: Mar. 31, 2017

(87) PCT Pub. No.: WO2016/054527
PCT Pub. Date: Apr. 7, 2016

(65) Prior Publication Data
US 2017/0253493 A1    Sep. 7, 2017

Related U.S. Application Data

(60) Provisional application No. 62/058,888, filed on Oct. 2, 2014.

(51) Int. Cl.
| | | |
|---|---|---|
| *C01G 3/12* | (2006.01) | |
| *C01G 11/02* | (2006.01) | |
| *C01G 21/21* | (2006.01) | |
| *C01B 19/00* | (2006.01) | |
| *B82Y 40/00* | (2011.01) | |
| *B82Y 20/00* | (2011.01) | |

(52) U.S. Cl.
CPC ............... *C01G 3/12* (2013.01); *C01B 19/007* (2013.01); *C01G 11/02* (2013.01); *C01G 21/21* (2013.01); *B82Y 20/00* (2013.01); *B82Y 40/00* (2013.01); *C01P 2002/72* (2013.01); *C01P 2002/88* (2013.01); *C01P 2004/04* (2013.01); *C01P 2004/51* (2013.01); *C01P 2004/64* (2013.01); *C01P 2006/22* (2013.01); *Y10S 977/773* (2013.01); *Y10S 977/824* (2013.01); *Y10S 977/825* (2013.01); *Y10S 977/896* (2013.01); *Y10S 977/95* (2013.01)

(58) Field of Classification Search
CPC .......... C01G 3/12; C01G 21/21; C01G 11/02; Y10S 977/95; Y10S 977/773; Y10S 977/825; Y10S 977/824; Y10S 977/896; C01B 19/007; C01P 2004/04; C01P 2004/64; C01P 2002/72; C01P 2006/22; C01P 2004/51; C01P 2002/88; C01P 2004/52; B82Y 20/00
See application file for complete search history.

(56) References Cited

U.S. PATENT DOCUMENTS 7,985,388 B2 * 7/2011 Shen ...................... B82Y 30/00
422/224

FOREIGN PATENT DOCUMENTS

| WO | WO 2006 137 851 A2 * | 12/2006 | ............. B82Y 30/00 |
| WO | WO 2006 137 851 A3 * | 12/2007 | ............. B82Y 30/00 |

OTHER PUBLICATIONS

Murray, et al., Synthesis and Characterization of Nearly Monodisperse CdE (E=S, Se, Te) Semiconductor Nanocrystallites, J. Am. Chem. Soc., vol. 115, No. 19, pp. 8706-8715 Sep. 1, 1993.
Li, et al., Synthesis and assembly of monodisperse spherical Cu2S nanocrystals, Journal of Colloid and Interface Science, vol. 330, No. 2, pp. 483-487 Feb. 15, 2009.
Quintana-Ramirez, et al., Growth evolution and phase transition from chalcocite to digenite in nanocrystalline copper sulfide: Morphological, optical and electrical properties, Beilstein Journal of Nanotechnology, vol. 5, pp. 1542-1552 Sep. 15, 2014.
Cui, et al., Strategies of Large Scale Synthesis of Monodisperse Nanoparticles, Recent Patents on Nanotechnology, vol. 3, pp. 32-41 Jan. 1, 2009.

* cited by examiner

*Primary Examiner* — Timothy C Vanoy
(74) *Attorney, Agent, or Firm* — Hodgson Russ LLP

(57) ABSTRACT

A methodology for synthesizing a nanoparticle batch, such as but not limited to a metal chalcogenide nanoparticle batch and further such as but not limited to a metal sulfide nanoparticle batch is predicated upon an expectation and observation that at elevated concentrations of at least one reactant material within a heat-up nanoparticle batch synthesis method, the resulting nucleated batch comprises nanoparticles that may be dimensionally focused to provide a substantially monodisperse nanoparticle batch. The embodied methodology is also applicable to a continuous reactor. The embodied methodology also considers viscosity as a dimensionally focusing result effective variable.

29 Claims, 16 Drawing Sheets

DIMENSIONALLY FOCUSED NANOPARTICLE SYNTHESIS METHODOLOGY

CROSS-REFERENCE TO RELATED APPLICATION

This application is related to, and derives priority from, U.S. Provisional Patent Application Ser. No. 62/058,888, titled Metal Chalcogenide Nanoparticles, Related Synthesis Methods and Applications and filed 2 Oct. 2014, the contents of which are incorporated herein fully by reference.

STATEMENT REGARDING FEDERALLY SPONSORED RESEARCH OR DEVELOPMENT

This invention was made with government support under Grant Numbers 1344562 & 1120296 awarded by the National Science Foundation. The Government has certain rights in the invention.

BACKGROUND

Field

Embodiments relate generally to nanoparticle fabrication methodology. More particularly, embodiments relate to a nanoparticle fabrication methodology with enhanced performance.

Description

By virtue of their size-tunable properties and facile solution processing, colloidal semiconductor nanoparticles (NPs), or quantum dots, have garnered intensive research interest as building blocks for many diverse applications that span from optoelectronics to biological imaging. The successful commercialization of promised NP technologies however hinges critically on the development of scalable fabrication methods to provide technologically significant quantities of high-quality NPs (i.e., NPs that have monodisperse particle size and uniform particle composition).

In a laboratory setting, monodisperse colloidal NPs are typically produced by a hot-injection method, in which organic-phase reagents are rapidly injected and mixed at high temperatures (>200° C.) and reacted for a short duration (<10 min). This hot-injection method has played a key role in advancing NP science by providing access to a broad library of NP sizes, shapes, and compositions. Unfortunately, high-quality NPs produced in the laboratory by hot-injection result from small-scale reactions (roughly <100 mg yield). A key barrier to scaling up hot-injection methods is the stringent demand for rapid precursor mixing required by the rapid reaction kinetics. For larger reactor volumes mixing is slower, which introduces obvious impediments to reproducibility and control. Moreover, there is a need for efficient synthesis methods to enable economical fabrication at scale that produce generally high quality NPs with comparatively high (i.e., >70%) yields.

In light of the foregoing, desirable are NP fabrication methods and fabrication materials, such as but not limited to quantum dot NP fabrication methods and fabrication materials, that provide enhanced NP fabrication conversion quantity capability and compositional uniformity capability.

SUMMARY

Attempts by the NP research community to resolve the foregoing scale-up challenges have led to several developments. In that light, FIG. 1 provides a summary of the efforts made by the NP community to scale-up NP syntheses, and a comparison to the presently embodied experimental production yields for NP materials.

Compared with the conventional hot-injection method, a gradual heat-up synthesis as embodied herein offers more design flexibility and quality control, specifically for NP synthesis at large scales. Vis-à-vis scale-up, an important advantage of the embodied heat-up method is that the reagent mixing aspects and the nanoparticle growth reaction aspects are temporally decoupled; this is achieved by thoroughly mixing the reagents at low temperatures (to minimize reaction rates), and then heating the mixed solution to initiate NP growth. To further advance the heat-up method towards large-scale synthesis as embodied herein, several key challenges must be addressed, namely to: 1) ensure burst nucleation during the heat-up stage, 2) control growth rates to enable size-focusing, and 3) maintain temperature uniformity through the ramp and growth stages. Lastly, fine control over NP growth rates and system stability to perturbations are as well also essential for successful scale-up.

The embodiments embrace these challenges as an opportunity to investigate a previously unexplored regime of nanoparticle synthesis: precursor concentrations near the solubility limit. In that light, one seeks to answer a central question of how does the nanosynthetic chemistry of a heat-up method differ when concentrations of nanoparticle reactant materials are intensified? One may find that this new regime provides a unique opportunity to enable a size-focusing, self-stabilizing NP synthesis reaction. Specifically, one may demonstrate that highly concentrated reagent solutions produce: (a) slow and size-focusing growth, (b) monodisperse NPs (<7% RSD), (c) delayed Ostwald ripening, and (d) high NP yield. The embodiments verify the robust scalability of an NP synthesis process by rigorous reproducibility and spike sensitivity tests. In comparison with conventional NP synthesis methodology (<8 g NPs/L solvent), the presently embodied highly concentrated heat-up methodology provides a ten-fold improvement in NP volumetric production capacity: 72 g NP/L solvent. High concentration and high precursor conversion enable process intensification: supplying efficient use of reagents, solvent, and reactor volume to produce high-quality NPs in comparatively large volume.

The embodiments also consider that the foregoing unexplored regime of nanoparticle synthesis may be characterized in terms of a generally high viscosity of a reactant composition from at least about 0.01 to at least about 100 poise.

The embodiments focus in a first instance upon copper (I) sulfide ($Cu_{2-x}S$) as a model system to more complex ternary copper sulfides (e.g., copper indium sulfide), which are a promising non-toxic alternative to cadmium and lead salt semiconductor based NPs. The embodiments also demonstrate how the embodied highly concentrated heat-up methodology can be successfully generalized to PbS and CdS NPs, as well as many other NPs. Through property characterization and modeling one may find that this highly concentrated regime creates fortuitous synthesis conditions by providing an increase in thermal stability that absorbs temperature perturbation and a decrease in mass diffusivity that protects the system from Ostwald ripening.

Within the context of the embodiments and the claims, "Ostwald ripening" is understood to mean a nucleated NP growth mechanism that leads to a linear increase in nanoparticle volume with time, which in turn generally inherently leads to an increase in variation of NP population sizes and thus also an increased relative standard deviation (i.e., greater than about 10%) of NP size.

Consistent with the foregoing, within the context of the embodiments and the claims particle size uniformity is understood to be determined by a relative standard deviation (RSD) of a population of NP's within a designated group, where such a RSD may be calculated using standard calculation methods as are known and understood to a person of ordinary skill in the art.

A particular nanoparticle synthesis method in accordance with the embodiments includes mixing together at a first temperature at least: (1) a first reactant material at a first concentration; and (2) a second reactant material at a second concentration, to provide a reactant composition. This particular method also includes thermally adjusting the reactant composition to a second temperature to provide a nucleated virgin nanoparticle population within a nucleated reactant composition, wherein at least one of the first concentration and the second concentration is sufficiently high to dimensionally focus the nucleated virgin nanoparticle population to a substantially monodisperse nanoparticle population when thermally soaking the nucleated virgin nanoparticle population in the nucleated reactant composition.

Another particular metal chalcogenide nanoparticle synthesis method in accordance with the embodiments includes mixing together at a first temperature at least: (1) a first metal reactant material at a first concentration; and (2) a second chalcogen reactant material at a second concentration, to provide a metal-chalcogen reactant composition. This particular method also includes thermally adjusting the metal-chalcogen reactant composition to a second temperature to provide a nucleated virgin metal chalcogenide nanoparticle population within a nucleated metal-chalcogen reactant composition, wherein at least one of the first concentration and the second concentration is sufficiently high to dimensionally focus the nucleated metal chalcogenide virgin nanoparticle population to a substantially monodisperse metal chalcogenice nanoparticle population when thermally soaking the nucleated virgin metal chalcogenide nanoparticle population in the nucleated metal-chalcogen reactant composition.

Another particular metal sulfide nanoparticle synthesis method in accordance with the embodiments includes mixing together at a first temperature at least: (1) a first metal reactant material at a first concentration; and (2) a second sulfur reactant material at a second concentration, to provide a metal-sulfur reactant composition. This other particular method also includes thermally adjusting the metal-sulfur reactant composition to a second temperature to provide a nucleated virgin metal sulfide nanoparticle population within a nucleated metal-sulfur reactant composition, wherein at least one of the first concentration and the second concentration is sufficiently high to dimensionally focus the nucleated virgin metal sulfide nanoparticle population to a substantially monodisperse metal sulfide nanoparticle population when thermally soaking the nucleated virgin metal sulfide nanoparticle population in the nucleated metal-sulfur reactant composition.

Finally, yet another nanoparticle synthesis method in accordance with the embodiments includes mixing together at a first temperature at least: (1) a first reactant material at a first concentration; and (2) a second reactant material at a second concentration, to provide a reactant composition at a first temperature and a first viscosity. This particular method also includes thermally adjusting the reactant composition to a second temperature to provide a nucleated virgin nanoparticle population within a nucleated reactant composition, wherein a second viscosity at the second temperature is sufficiently high to dimensionally focus the nucleated virgin nanoparticle population to a substantially monodisperse nanoparticle population when thermally soaking the nucleated virgin nanoparticle population in the nucleated reactant composition.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein.

(b) Size and (c) relative standard deviation (RSD) of $Cu_{2-x}S$ NPs at various CuCl concentration reactions over a 4 hr soak at 185° C. For concentrations below 500 mM, NPs experience Ostwald-ripening with time. At 500 mM and above, NP solutions are at equilibrium with a near constant size with time. Relative ordering of legend and data occurs for NP size at 4 hours and RSD at 1 hour.

Figure 4:
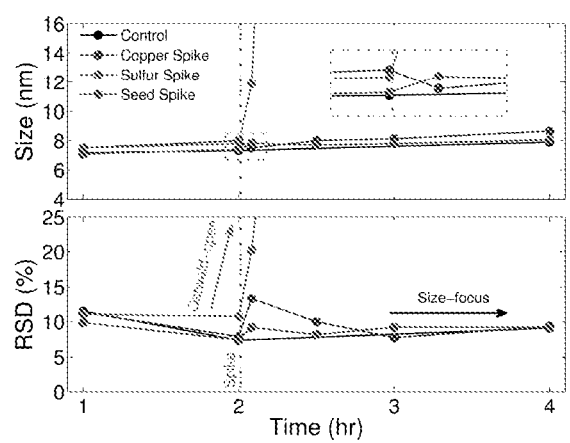

FIG. 4 summarizes reaction robustness. Concentrated reactions spiked with three different starting chemicals, 1000 mM CuCl, 1000 mM S, and 1000 mM equivalent $Cu_{2-x}S$ seeds in OLA/ODE mixture. Spike is injected after the 2 hr aliquot. The inset zooms in on the behavior of the spike: 1) copper decreases average size, 2) sulfur induces Ostwald-ripening, and 3) seeds increase average size. Spiking with copper and seeds leads to size focusing within 1 hour.

Figure 5:
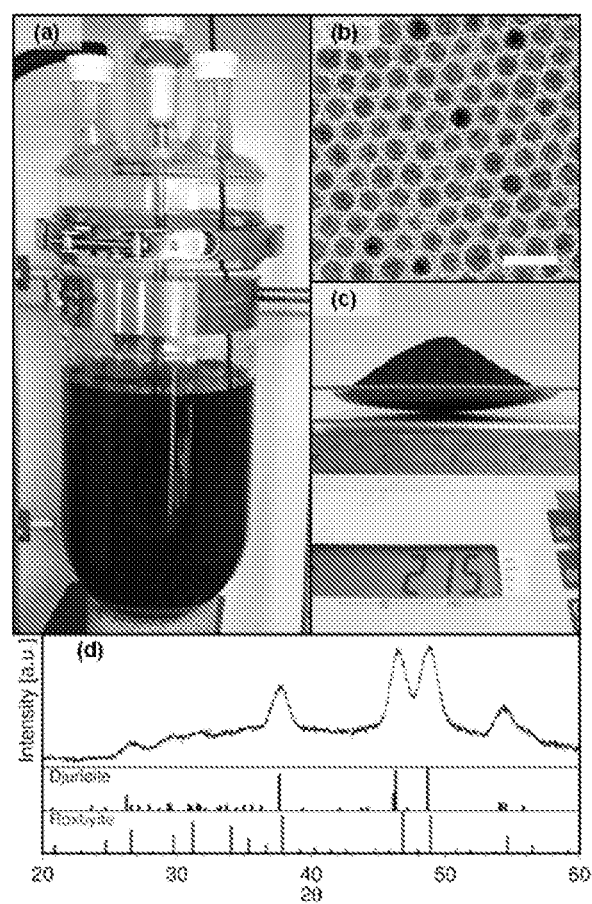

FIG. 5 shows large-scale reaction. (a) 2.5 L reaction of $Cu_{2-x}S$ nanoparticles. Solution is mixed via overhead stirrer at 700 rpm. (b) TEM of $Cu_{2-x}S$ nanoparticles with an average size and RSD of 8.0 nm and 9.3%, respectively. TEM images were consistent with various samplings of the final product. White scale bar on TEM image is 20 nm (c) Total recovered product of 215 g from the reaction vessel after purification and drying. (d) XRD pattern of collected NP powder. The pattern is a mix between the Djurleite ($Cu_{1.94}S$) and Roxbyite ($Cu_{1.8}S$) phases.

Figure 6:
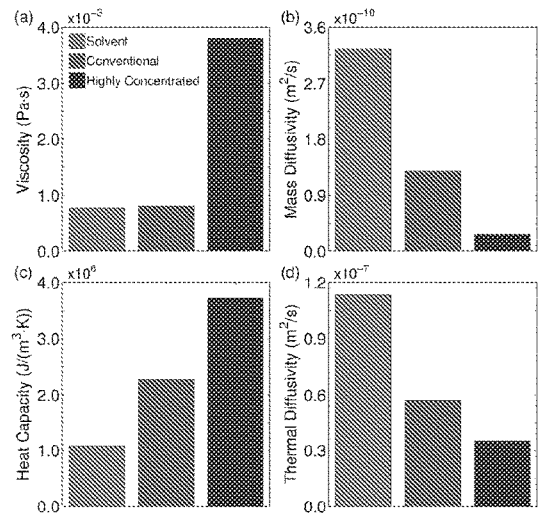

FIG. 6 shows experimental physical properties for conventional vs. highly concentrated NP solutions: (a) viscosity and (c) heat capacity are proportional to precursor concentration while (b) mass and (d) thermal diffusivities are inversely proportional to precursor concentration (see FIG. 8 and Table 2 for methods, details).

Figure 7:
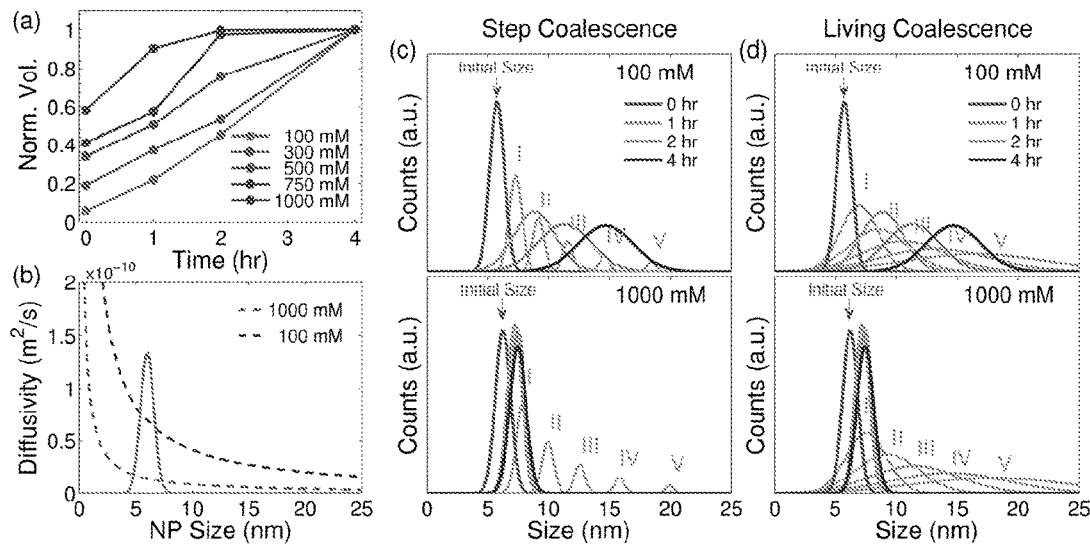

FIG. 7 shows: (a) Plots of the volumetric growth rate. The NP sizes for each concentration are converted to volume and normalized by the 4 hr "final" volume. Linearly increasing volume with time indicates Ostwald ripening, where a sigmoidal dependence suggests coalescence or monomer addition. (b) The change in Stokes-Einstein diffusivity over various particle sizes at a constant solution viscosity for the 100 and 1000 mM reaction. The average initial size distribution for both concentrations is overlaid. The diffusivity in the 100 mM reaction is five times greater than the diffusivity in the 1000 mM reaction with the same NPs. (c-d) (color curves) Mapping of the temporal evolution (0-4 hrs) of experimentally determined values, expressed as Gaussians of the mean size and SD of the conventional (top) and highly concentrated (bottom) reactions. (gray curves) I-V correspond to a projection of the system after coalescence events, with each curve progression marking a halving of the number of particles from the previous cure (e.g., condition II has half the particles of condition I, and III half that of II). (c) Step coalescence represents an aggregation mechanism where each particle must coalesce once before any particle can coalesce twice while (d) living coalescence represents a mechanism where some particles experiencing multiple coalescence events while others experience none.

Figure 8:
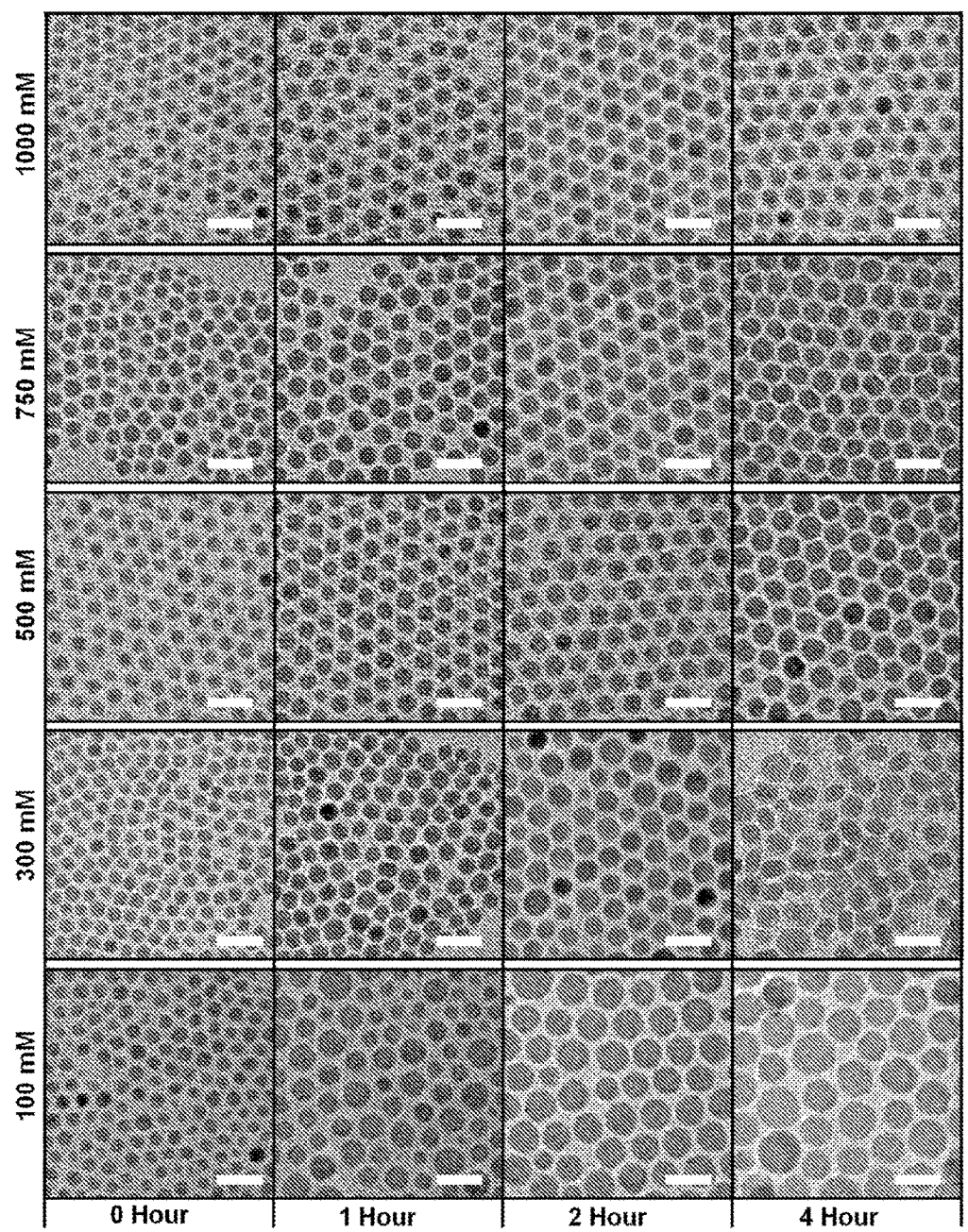

FIG. 8 shows a series of TEMs and their size distribution (100 NP count) for several soak times (columns) and concentrations (rows). TEMs correspond to data in FIG. 3. TEM scale bar is 20 nm.

Figure 9:
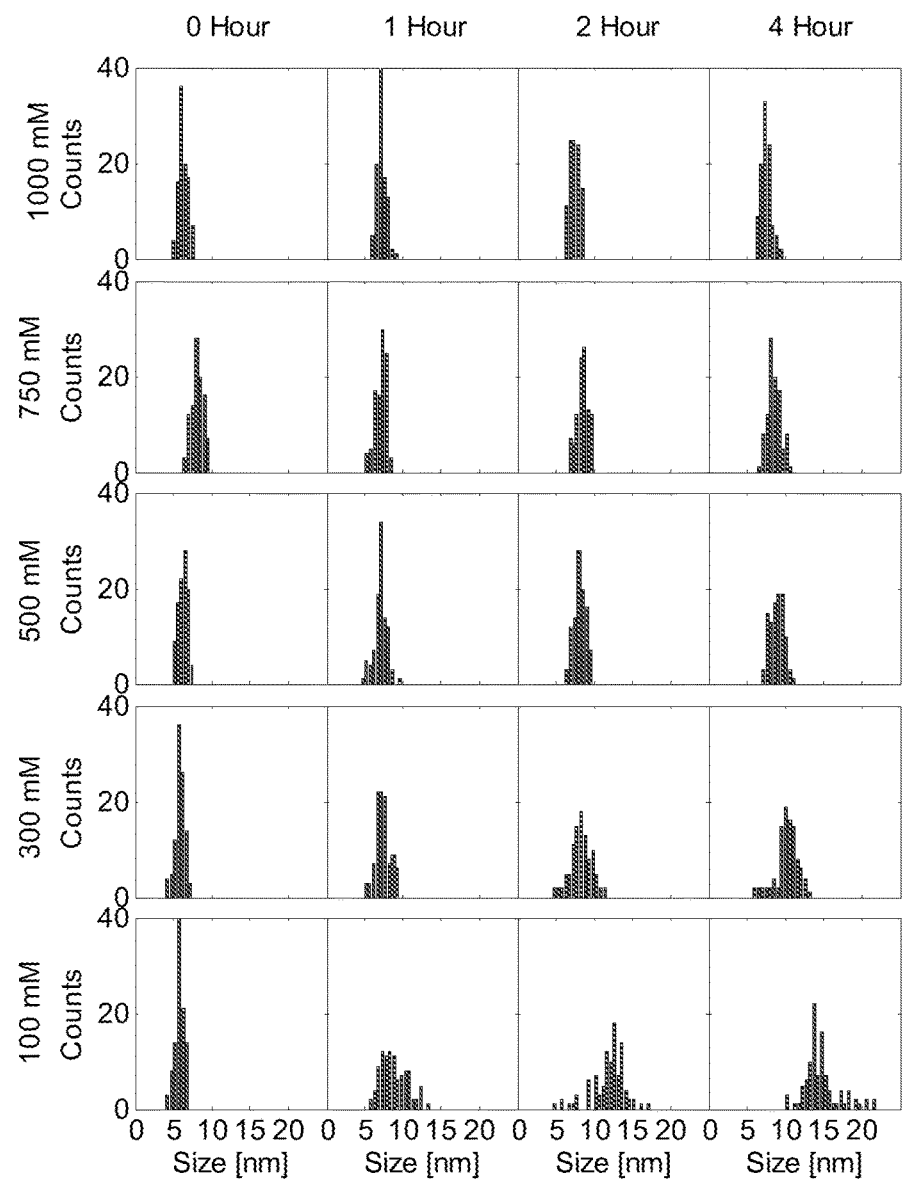

FIG. 9 shows histograms of NP sizes measured from TEM image. A representative TEM for each histogram is shown in FIG. 8. The mean and RSD (standard deviation/mean) of these histograms are plotted in FIG. 3. Bin size is 0.5 nm.

Figure 10:
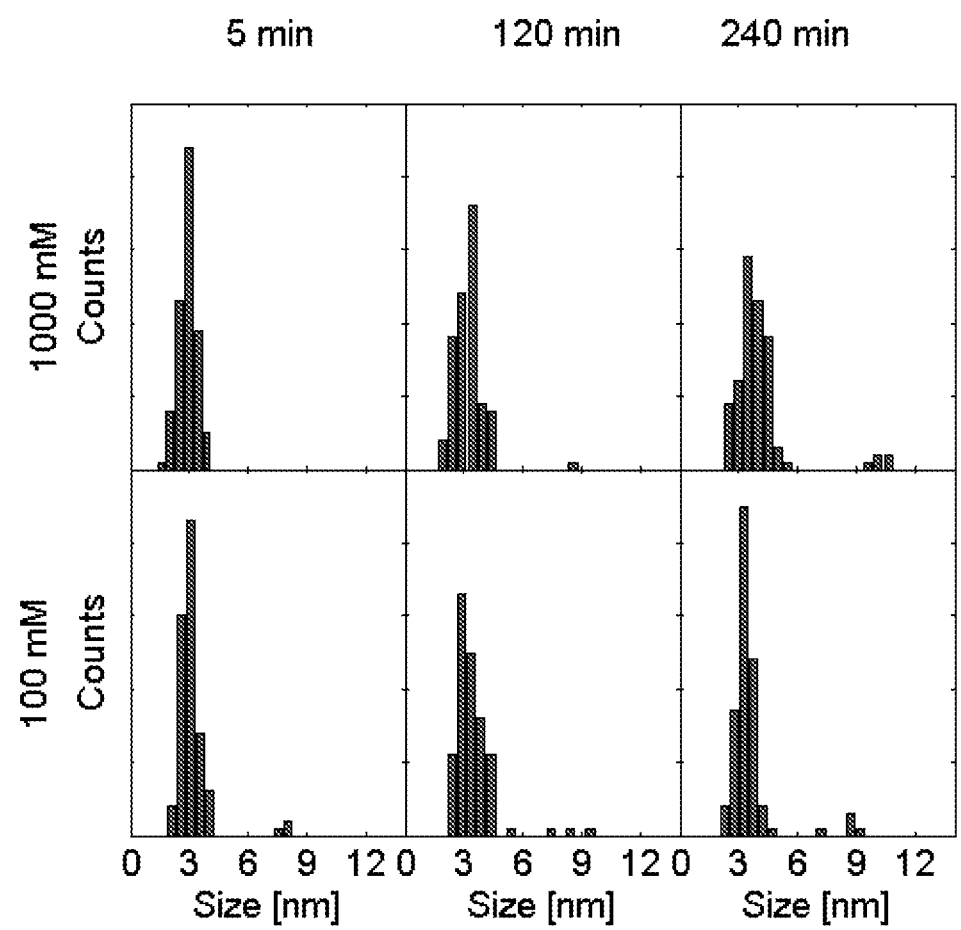

FIG. 10 shows histograms of the extended mixing stage at 50° C. on for the highly concentrated (1000 mM) and conventional (100 mM) synthesis condition. Precursors are mixed at time equals zero and then soaked for 4 h at 50° C. with aliquots at 5 min, 120 min and 240 min. 100 particles are counted in determining the size and RSD of the NPs. Average size fluctuations are within measurement error. It should be noted within the conventional synthesis, there existed a few NPs with sizes approximately 8 nm with no intermediate sizes between the seeds (2-3 nm NP). Large particles are only observed within the highly concentrated reaction at 4 hr. These 8 nm particles are neglected in the determining of the size and RSD.

Figure 11:
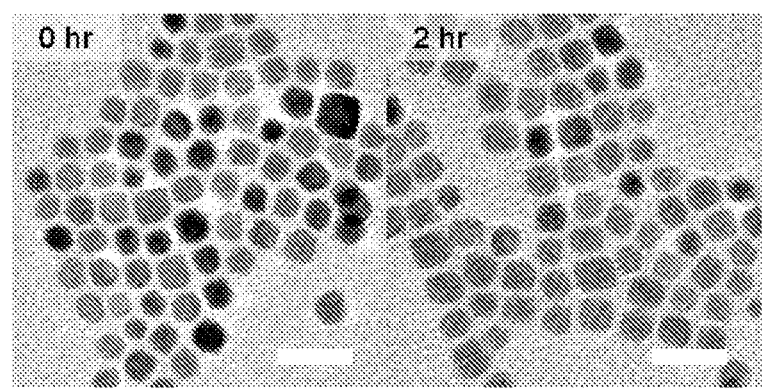

FIG. 11 shows TEM images of PbS NPs at 0 hr and 2 hr of the soak at 185° C. The NPs maintain a nearly constant size and quality through the reaction duration. The measured size and RSD at 0 hr is 7.0 nm and 17.5%, respectively. Similarly, at 2 hr, the size and RSD is 7.8 nm and 15.1%, respectively. Scale bar is 20 nm.

Figure 12:
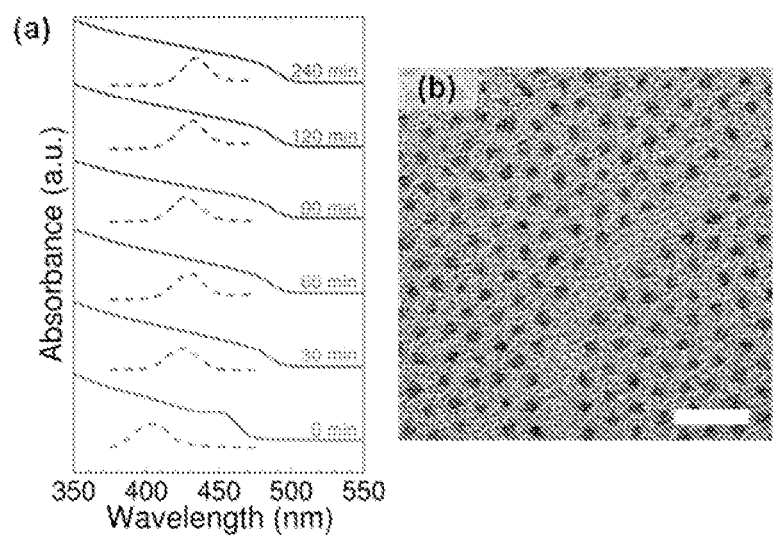

FIG. 12 shows: (a) Absorbance (solid) and PL (dotted) spectrum of a concentrated CdS reaction where a 2.5M TOP:S solution is injected into a 1.0M Cd-Oleate at 50° C. The reaction is heated to 185° C. and aliquots are extracted every 30 min. After 30 min the absorbance edge stops shifting, indicative of a halted NP growth. (b) TEM image of the reaction at 0 min into the soak.

Figure 13:
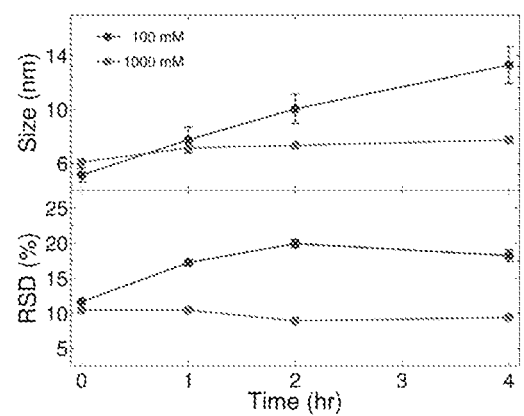

FIG. 13 shows replicate experiments (three experiments each) for the conventional (100 mM [CuCl]) and highly concentrated (1000 mM [CuCl]). Reactions performed under similar conditions. The error bars are deviations between NP sizes at that time. Marker size is equivalent to a 5% deviation. NPs from the conventional reactions vary between experiments—associated with thermal fluctuations, i.e. different heating mantle and ambient conditions. NPs from the highly concentrated reactions are consistent (~5% deviation—error bars are small and are covered by markers). Concentrated systems are thermally more robust potentially due to lower thermal diffusivities. The error bars on the high concentrated conditions are smaller than the data points.

Figure 14:
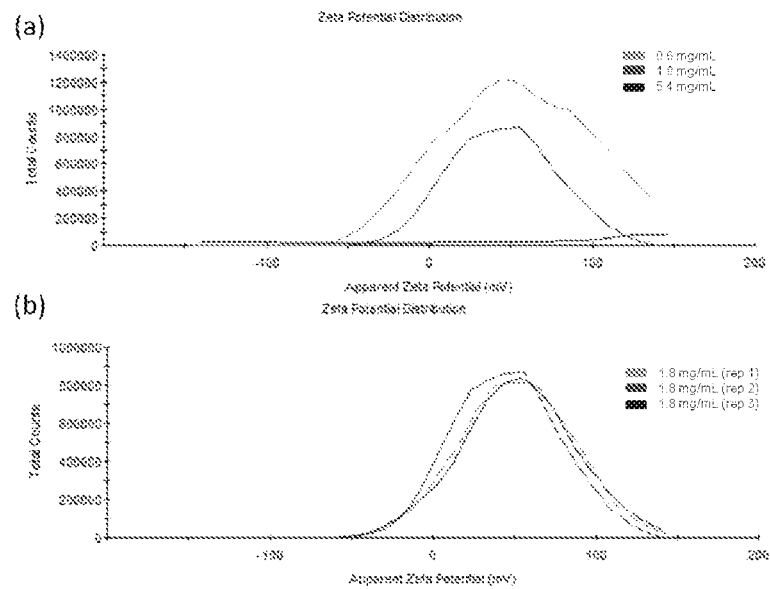

FIG. 14 shows Dynamic Light Scattering (DLS) of cleaned NP from the concentrated (1000 mM) reactions. Samples were diluted in hexane in order to get accurate zeta potentials. The Huckel theory is used to predict the zeta potentials. (a) Various NP dilutions in hexane and (b) three replicates at concentration ~1.8 mg NP/mL, that yield an average zeta potential of ~+50 mV.

Figure 15:
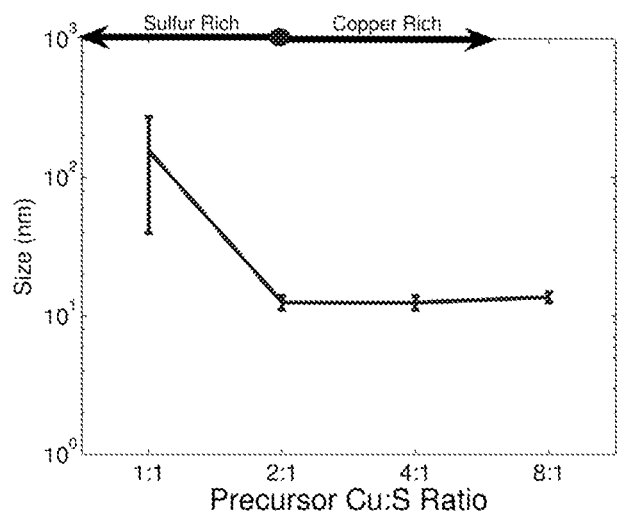

FIG. 15 shows reaction performed at different copper to sulfur ratios with Cu:S ratio of 2:1 is stoichiometric. A Cu:S ratio of 1:1, or sulfur rich, yields large polydisperse particles. Reactions run at stoichiometric conditions or greater in copper content remain small. Increasing copper content also decreases poly-dispersity to a small degree. All NP sizes correlate to a 2 hr soak.

Figure 16:
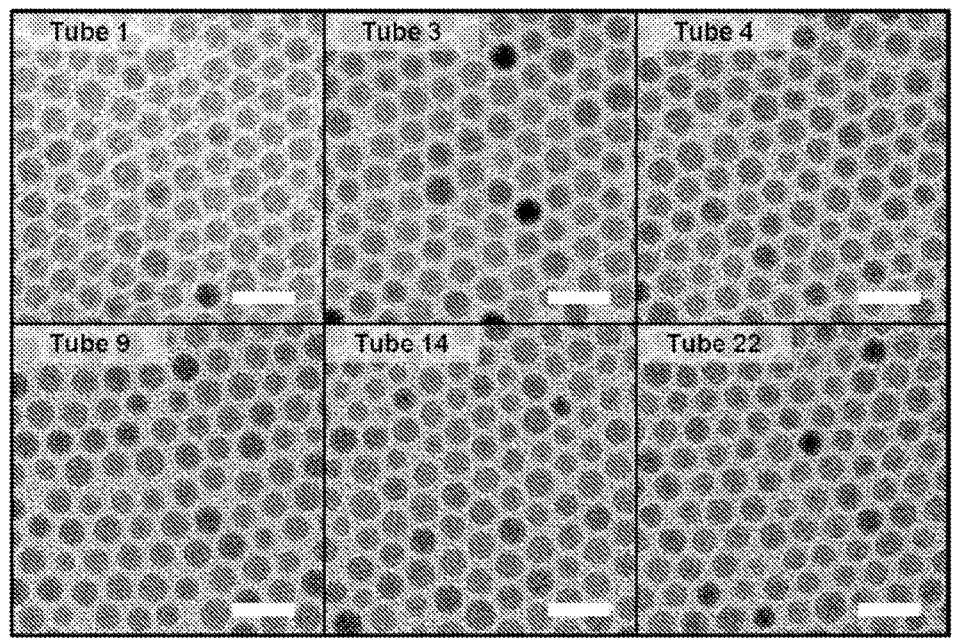

FIG. 16 shows TEM images of randomly selected centrifuge tubes of the 2500 mL reaction cleaned at various times: 1) Tubes 1-8 were fully cleaned 2 hrs after quench, 2) Tubes 9-12 were fully cleaned 3 hrs after quench, 3) Tubes 13-16 were fully cleaned 4 hrs after quench, 4) Tubes 17-24 were fully cleaned 6 hrs after quench. Scale bar is 20 nm.

Figure 17:
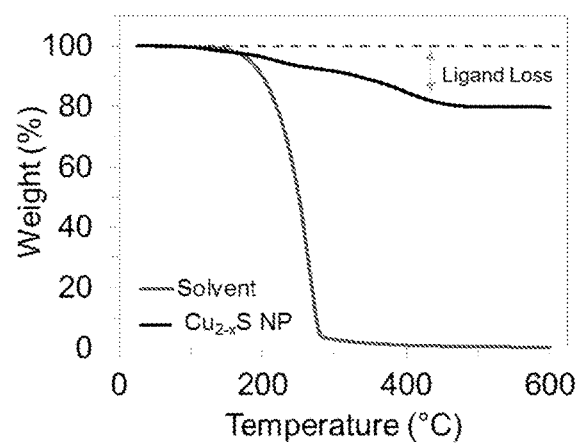

FIG. 17 shows thermogravimetric analysis (TGA) of large-scale synthesis product, compared to oleylamine (80% purity) and 1 M CuCl in oleylamine. Only 20% of the large-scale product was ligand.

Figure 18:
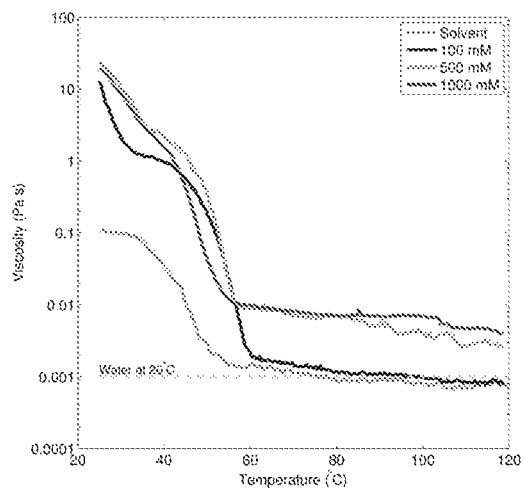

FIG. 18 shows viscosity measurements of the raw (unpurified) conventional (100 mM [CuCl]) reaction and the highly concentrated (1000 mM [CuCl]) reaction solutions between 25 to 120° C. are done using a parallel plate rheometer. The viscosity of the highly concentrated reaction is ~4 cP. The viscosity of the conventional reaction is ~0.8 cP. A water reference is given to provide a baseline for observational viscosity. Above 120° C., the raw reaction solution beginnings to vaporize (and mass loss is visible in the TGA data, FIG. 17-18), impairing reliable viscosity measurements.

Figure 19:
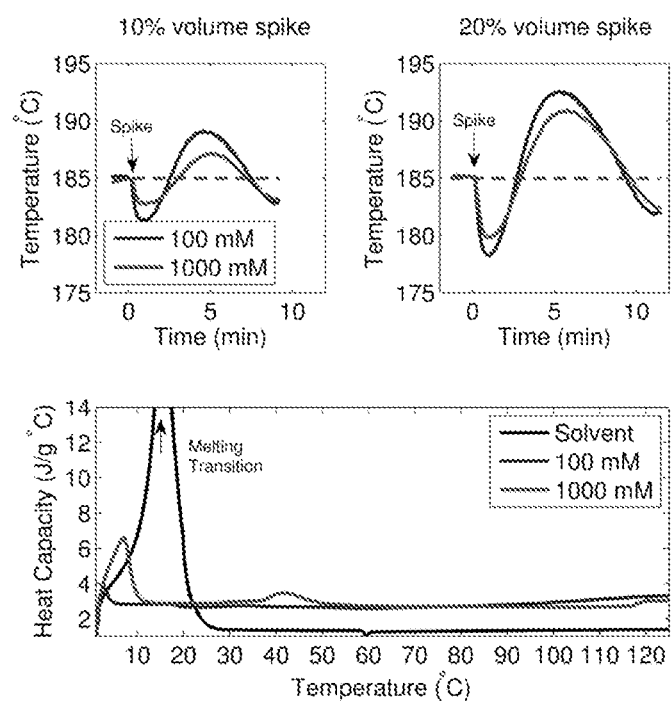

FIG. 19 at top shows thermal spike experiment of the highly concentrated and conventional reaction. A 10 vol. % and a 20 vol. % solvent spike is injected into the NP solution at 185° C. The initial spike and the subsequent oscillation is provided. A 2° C. and 4° C. temperature drop is observed with a 10 vol. % spike for the highly concentrated and conventional condition, respectively. The temperature drop is nearly doubled for each condition with a 20 vol. % spike. Bottom shows specific heats of 70/30% oleylamine/octadecene solvent, and the raw conventional and highly concentrated condition from differential scanning calorimetry (DSC). The heat capacity of the pure solvent is lower than that of the NP solutions. The highly concentrated condition has a slightly larger (factor of 2) specific heat than the conventional condition and therefore can retain heat its thermal energy or is less susceptible to thermal perturbation. The gradual rise in heat capacity above 80° C. may be due to mass loss from the sample pan, which would inflate the heat capacity. Specific heat values at 50° C. are reported in Table 2.

Figure 20:
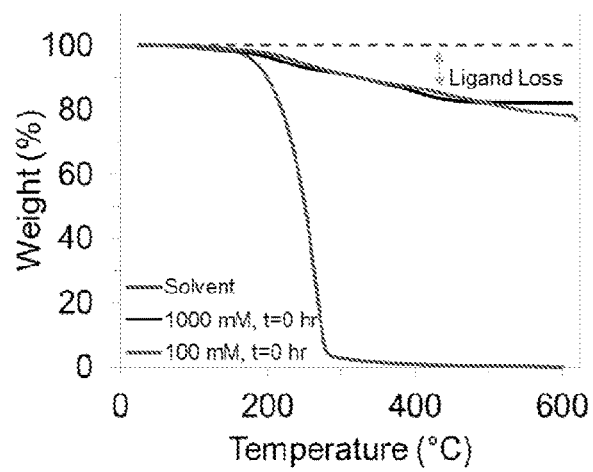

FIG. 20 shows thermogravimetric analysis (TGA) of cleaned conventional and highly concentrated product. Similar ligand lost is observed for both conditions, with a slightly higher ligand content in the conventional case. The mass loss is comparable to the large scale reaction in FIG. 17. The OLA/ODE mixture is plotted for a reference to the solvent.

Figure 21:
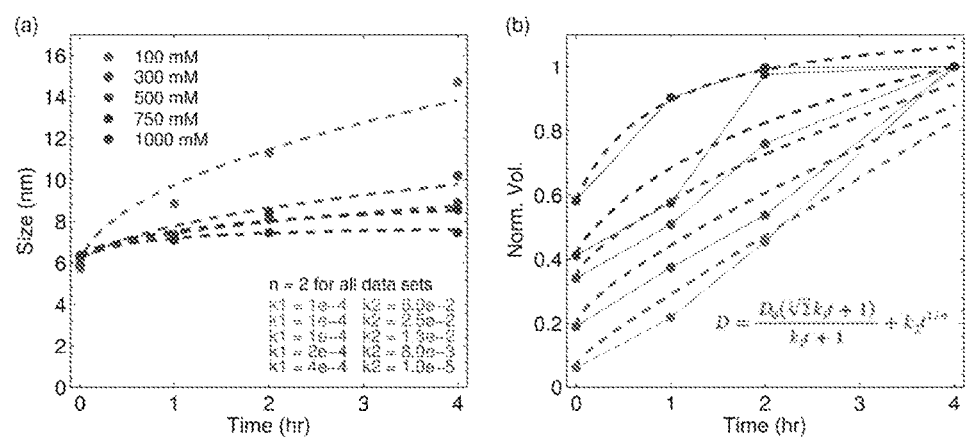

FIG. 21 shows: (a) Measured NP sizes from experiments at all concentrations fitted with a coupled oriented attachment (OA) and Ostwald ripening (OR) model. The fitting parameters are included within the graph and are arbitrarily fitted. (b) The particle sizes are converted to particle volumes to better understand how it fits the data. The equation used to fit the particle sizes is provided in this graph; where the first term in the expression is the OA rate and the second is the OR rate. Interestingly, the value of $k_2$ drops substantially as the concentration of the reaction increase, which is supportive of their linear volumetric growth. On the other hand, $k_1$ or OA rate for each concentration remains small and nearly constant, suggests the growth from this process is small, yet in the high concentrations (750 and 1000 mM) $k_1$ becomes prominent. The fitted volumes are based on a simply sphere volume and then normalized with the particle volume at 4 hour. The $R^2$ suggests the Huang models fits the data well ($R^2$ near 1), but observationally, the fits do not converge to 1 when normalized by the experimental data at 4 hrs. See Table 4 for $R^2$ values fit comparisons.

Figure 22:
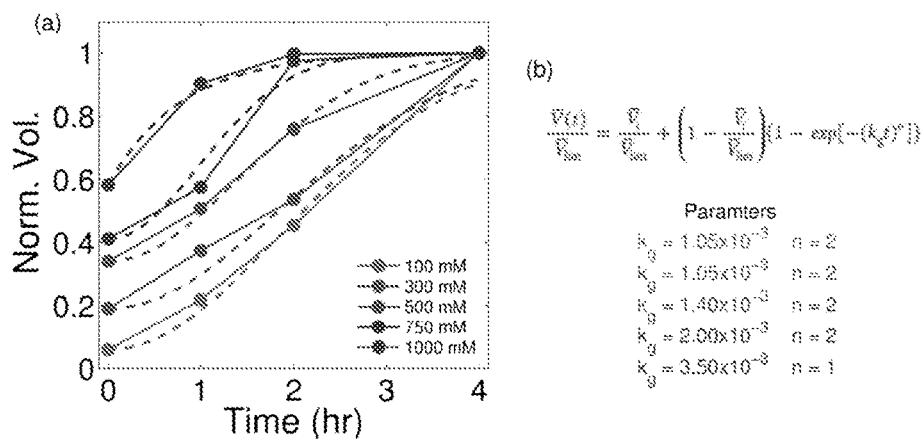

FIG. 22 shows: (a) Particle volumes fitted with the KJMA model (dashed lines). (b) The KJMA equation used to fit the data in terms of normalized volume, where $V_{lim}$ is the particle volume at 4 hrs. The fitting parameters are provided below the equation and are color coded to the reaction concentrations. The model is designed to fit sigmoidal growth curves, in which monomer addition or coalescence is dominant ($k_g$). This model does not capture the Ostwald ripening phenomena. In comparison to the other discussed models, the fits here have the greatest $R^2$ values for the entire concentration span. However, there is very little meaning behind each fitting parameter (e.g. n is an arbitrary value and $k_g$ is a lumped growth rate). See Table 4 for $R^2$ values fit comparisons.

Figure 23:
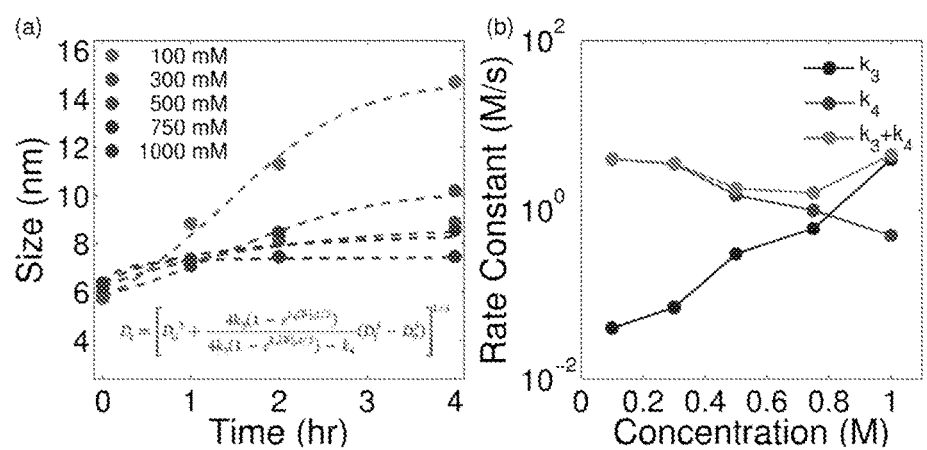

FIG. 23 shows: NP size fitting model proposed by Finney et. al. (a) The fitted data the particle sizes shown in FIG. 3, FIG. 8 and FIG. 9. The equation used to fit the data is included within the graph. An example particle concentration, [B] is calculated below in the sample calculation section of this document. (b) The rate constant fitting parameters $k_3$ and $k_4$ are the bimolecular (coalescence) and the autocatalytic rate (Ostwald ripening) rates, respectively. The increase in $k_3$ with increasing precursor (salt) concentration is related to the increased screening of the greater anion concentration. This effectively reduces repulsive forces between particles, enabling them to collide more frequently. Similarly, higher anion concentration increases the probability of surface bound ions, which stabilizes the particle surface and therefore reducing its reactivity to other particles. This effectively would reduce the autocatalytic rate, $k_4$. See Table 4 for $R^2$ values fit comparisons.

Figure 24:
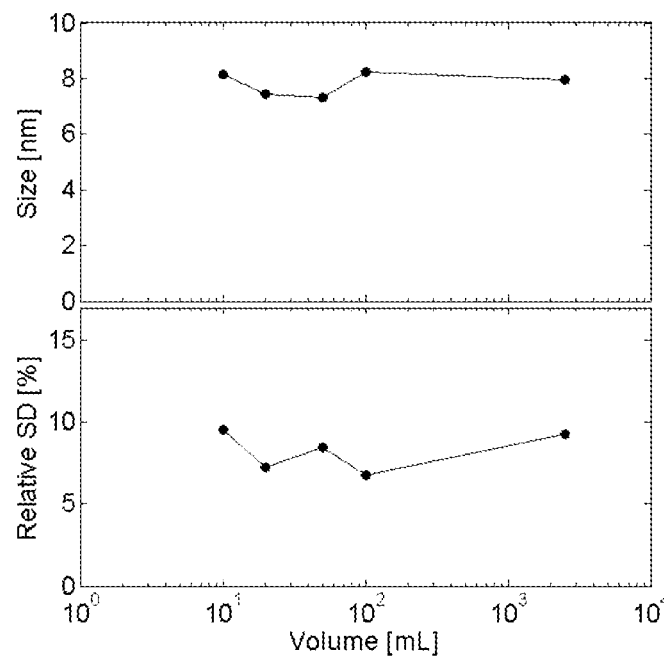

FIG. 24 shows highly concentrated reactions performed at different volumes covering 3 orders of magnitude (10 mL to 2500 mL). NPs for each reaction are similar in size.

Figure 25:
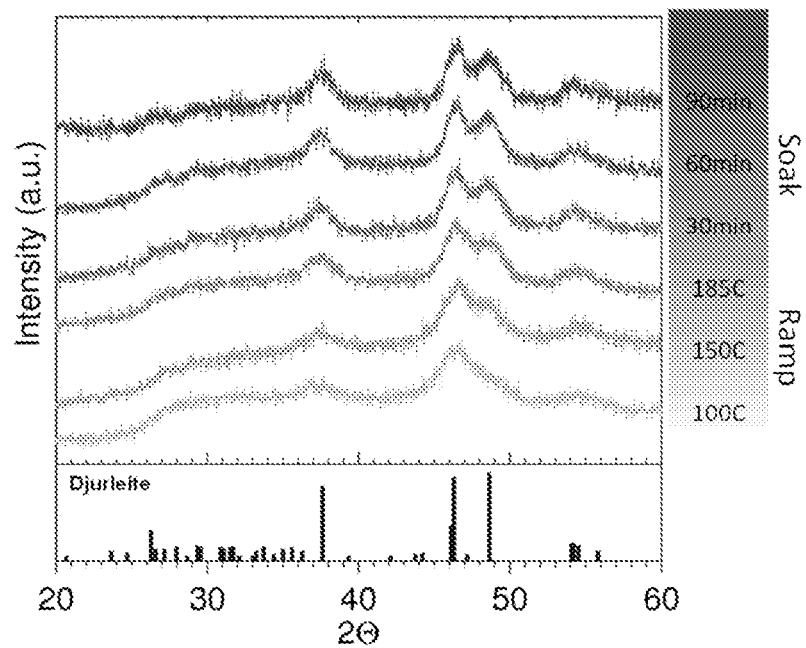

FIG. 25 shows series of XRD patterns from the same concentrated (1000 mM) reaction at various temperature along the ramp and various times in the soak at 185° C. The Djurleite phase, theoretical peaks provided at the bottom, best matches each pattern. NP begin to crystallize during the ramping process and no longer crystallize during the soak.

Figure 26:
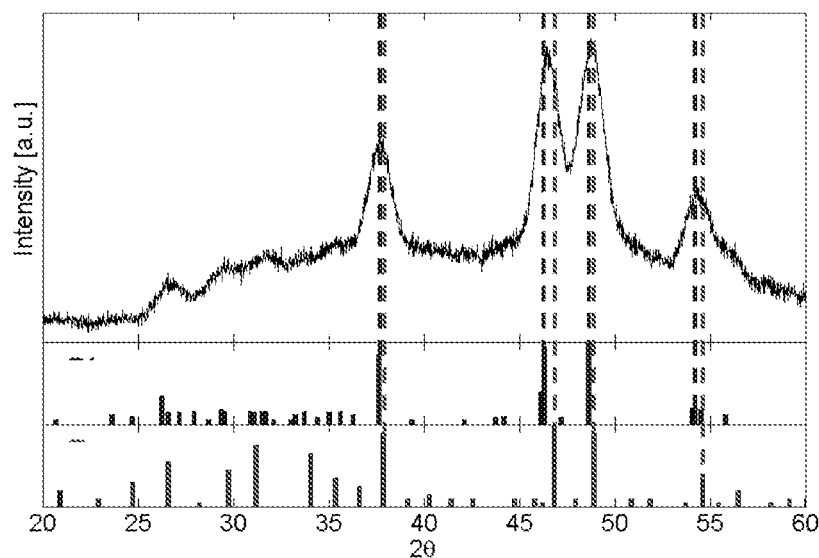

FIG. 26 shows XRD pattern of 2500 mL reaction. The pattern is between the Djurleite phase ($Cu_{31}S_{16}$) and the Roxbyite phase ($Cu_7S_4$).

Figure 27:
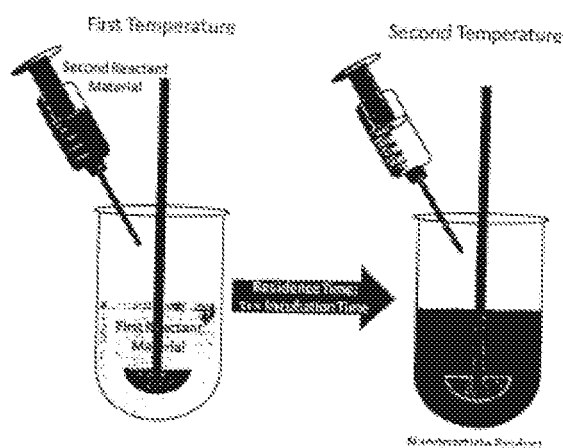

FIG. 27 shows a schematic diagram of a batch reactor apparatus in accordance with the embodiment. Within the batch reactor apparatus a first temperature describes the temperature at which a second reagent material is mixed with the first reagent material. The mixture then proceeds to a second temperature with some incubation time. This incubation time is equivalent to the reaction residence time. The residence time is the same for both, batch and continuous, processes.

Figure 28:
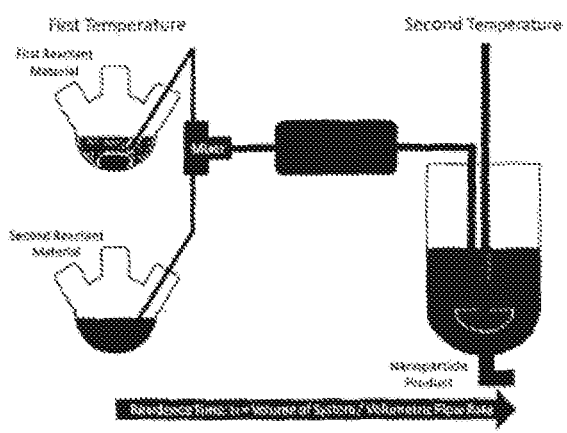

FIG. 28 shows a schematic diagram of a continuous reactor apparatus in accordance with the embodiments. In the continuous reactor apparatus, a first reagent material and a second reagent material are in two separate starting vessels at a first temperature. These starting vessels can be either of the following: 1) a flask with finite volume; or 2) a reagent buffer tank with continuous feed. The first reagent and the second reagent material are drawn from starting vessels into a mixer. The mixer can be of the following: 1) simple T-joint, 2) T-joint with agitation (sonication), or 3) separate vessel with rotational mixing (stir bar or overhead stirrer). A mixed fluid proceeds into a heater and heats to a second temperature. A heater can be of the following: 1) a simple cross flow heat exchanger (heat transfer between mixture and heat transfer fluid); or 2) a tubular reactor (submerged tube in oil bath at constant temperature). A mixture at a second temperature flows into a continuous stirred tank reactor (CSTR) with an incubation time equivalent to the ratio of reactor volume to volumetric flow rate (units of time). Ratio is the residence time. Product is flown out the bottom as effluent.

DETAILED DESCRIPTION OF THE NON-LIMITING EMBODIMENTS

I. Basic Considerations

The embodiments provide a method for synthesizing a NP population with a relatively uniform particle size distribution as evidenced by a small (i.e., less than about 7% and preferably less than about 5% and still more preferably less than about 3%) relative standard deviation with respect to NPs synthesized within the NP population. The method in accordance with the embodiments that yields the relatively uniform NP population size utilizes reactant materials at least one of which is at or near (i.e., no more than about 50% below and more preferably no less than about 70% and more preferably no less than about 80% and still more preferably no less than about 90%) of a solubility limit of the reactant material within a solvent or a reactant composition that is used when synthesizing the NP population. Alternatively, the embodiments also consider a reactant composition viscosity as a variable that influences monodispersity of a population of nucleated nanoparticles when thermally soaked in the reactant composition. Preferably the reactor composition viscosity is greater than about 0.01 poise, more preferably greater than about 1 poise and still more preferably greater than about 100 poise. Alternatively when a viscosity effect is described relative to two temperatures each having a separate viscosity the one of the viscosities is generally from about 0.01 to about 1 poise and the other viscosity is generally from about 1 to about 100 poise.

While the embodiments are described within the specification within the context of a "batch" of NPs whose particle size distribution is generally low due to utilization of at least one reactant at or near a saturation limit with respect to a reactant composition, the embodiments are not intended to be so limited.

Rather in a first instance, the embodiments are applicable with respect to a "batch reactor apparatus" fabrication of a population of NPs as well as a "continuous reactor apparatus" fabrication of a population of NPs. Additional details with respect to such a batch reactor apparatus are described within FIG. 27, including the brief description above within the Brief Description of the Drawings. Additional details with respect to such a continuous reactor apparatus are described within FIG. 28, including the brief description above within the Brief Description of the Drawings.

A NP batch synthesized in accordance with the embodiments may comprise a NP material selected from the group including but not limited to metal carbide materials, metal nitride materials, metal oxide materials and metal chalcogenide materials. Particularly desirable within the context of the embodiments are metal chalcogenide NP materials and particularly metal sulfide NP materials. Chalcogenides in accordance with the embodiments may be selected from the group including but not limited to sulfur, selenium and tellurium. Metals in accordance with the embodiments may be selected from the group including but not limited to copper, lead, cadmium, indium and, zinc.

Within the embodiments, a thermal soaking of a virgin nanoparticle batch to dimensionally focus same and provide a substantially monodisperse nanoparticle batch may be undertaken at a thermal soak temperature less than the batch nucleation temperature, equal to the batch nucleation temperature or greater than the batch nucleation temperature. Such a batch nucleation temperature is generally in a range from about 50 to about 200 degrees C. for synthesis of a NP batch in accordance with the embodiments.

Within the embodiments, the concentrations of different reactant materials may differ with respect to different classes of reactant materials (i.e., metal reactant materials in comparison with chalcogen reactant materials). Alternatively, within the same class of reactant material, the concentrations of reactant materials may be substantially equivalent.

With respect to a solubility limit of a reactant material within a reactant composition the embodiments may generally illustrate that above a product solubility or at supersaturation the dimensional focusing aspects of the method in accordance with the embodiments is realized.

As an alternative characterization of the embodiments, the dimensional focusing aspects of the embodiments are also realized under circumstances where: (1) one of a first concentration of a first reactant and a second concentration of a second reactant is at least about 1000 mM; and (2) the other of the first concentration and the second concentration is at least about 100 mM. Generally but not exclusively, the first reactant is a chalcogenide within the embodiments and the second reactant is a metal within the embodiments.

Additional parameters for the method in accordance with the embodiments are illustrated within the examples of the embodiments. Unless specifically designated to the contrary, a range for any given parameter may be regarded as +/−20%.

II. Results

A. Concentration Effects

To enable robust and reliable synthesis of monodisperse NPs, three conditions must be met: 1) nucleation burst, 2) size-focusing growth, and 3) delayed Ostwald ripening. In this work one may show that these conditions can be met by using a heat-up method, and substantially increasing precursor concentrations beyond conventional NP synthesis conditions. In the discussion below, reference is made to concentrations employed in traditional NP synthesis (~100 mM) as 'conventional' in contrast to the 'highly concentrated' conditions (i.e., 1000 mM) near the maximum solubility or saturation limit for the precursor in the reaction solvent. Based on a literature survey of conventional syntheses, typical precursors concentrations are one to two orders of magnitude lower, ranging from 10-100 mM (see Table 1 for a detailed comparison).

Figure 1:
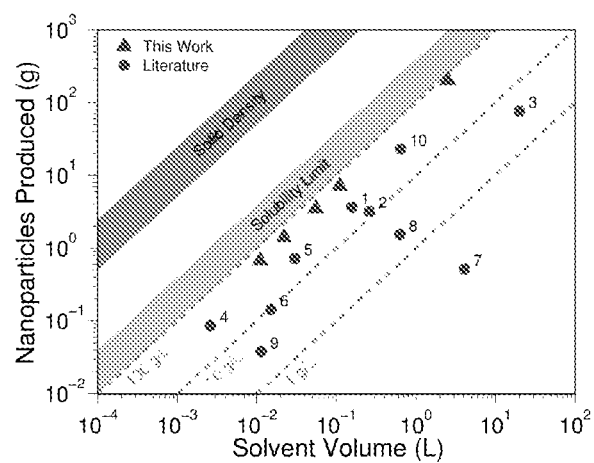
FIG. 1 summarizes recent NP scale-up efforts in comparison with the embodiments. Experiments from this work are compared with literature reports based on the theoretical maximum possible NP yield. Production yields are depicted by the green hash-lines, and are a ratio of the full conversion of the limiting reagent to the total reaction volume. Approximate precursor solubility in long-chain organic solvents and solid precursor densities are displayed in the light and dark gray regions, respectively. Literature materials: 1) PbS, 2) $Fe_2O_3$, 3) CdSe, 4) PbS, 5) PbS, 6) CuS, 7) CISe, 8) CdSe, 9) CdSe, and 10) PbS.
Figure 2:
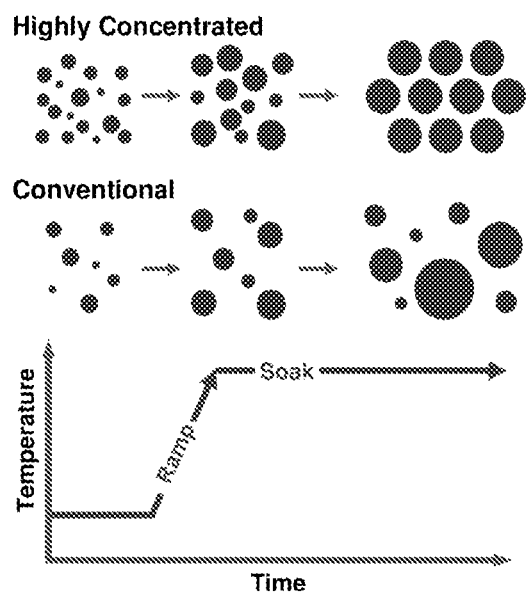
FIG. 2 summarizes NP reaction mechanisms. Shown is a comparison of the new highly concentrated approach to the conventional NP reaction concentration using a heat-up method. Initially, both NP concentrations are the same in size and dispersion. Divergence between concentrations occurs upon soaking the NPs for an extended duration. The highly concentrated solution size focuses and become monodisperse; whereas the conventional synthesis experiences Ostwald-ripening.

The basic aspects of the embodied heat-up synthesis are schematically illustrated in FIG. 2. Organic-phase precursors are first mixed at 50° C. to ensure a uniform solution concentration and the suppression of particle growth; then, the solution is heated up to and maintained (i.e., soaked) at 185° C. to grow the NPs. At the low-temperature mixing stage, both the conventional and highly concentrated reactions consist of small polydisperse NP seeds (~3 nm). However, as these seeds are heated to 185° C., the conventional and highly concentrated conditions produce greatly divergent results: under conventional conditions the seed NPs grow into a polydisperse set, but at highly concentrated conditions the particles size focus and become monodisperse (FIG. 2).

Figure 3:
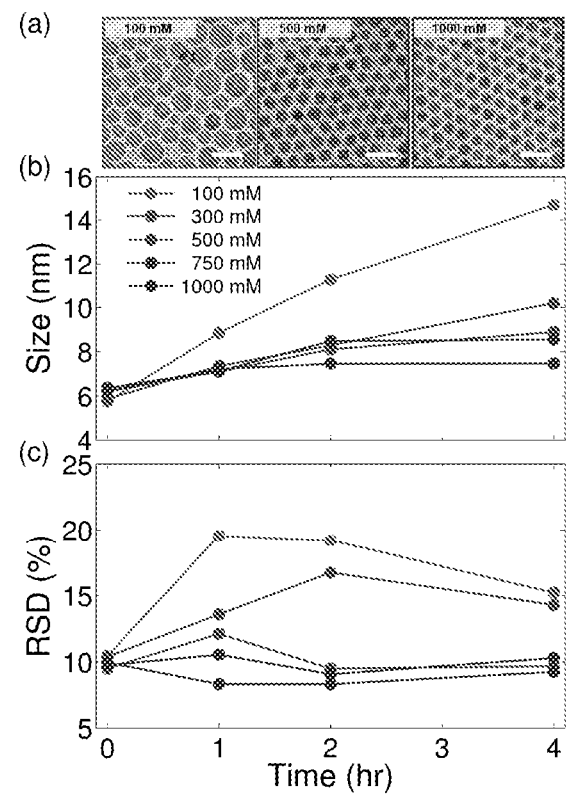
FIG. 3 summarizes effect of precursor concentration. (a) TEM images are color correlated to 100 mM, 500 mM, and 1000 mM reactions to illustrate size and quality. Scale bars are 20 nm.

The evolution of NP size and relative standard deviation (RSD) during the extended soak at 185° C. differs significantly for conventional and highly conditions (FIG. 3). RSD is defined as the ratio of standard deviation over mean NP diameter. To quantify the evolution of NP diameter and RSD, we extract aliquots and measure the size distribution for a large particle set (statistical NP size analysis is provided in FIG. 8 to FIG. 9). Low concentrations (<500 mM) yield rapid particle growth (~2.5 nm/hr) with extensive broadening of the size distribution (15-20% RSD). In contrast, more concentrated solutions (≥500 mM) result in significantly slower particle growth (~0.25 nm/hr) and a narrowing size distribution (7-12% RSD). Specifically, as soak time increases the conventional concentration produces NPs that continue to increase in size (5.7 nm at 0 hr to 14.7 nm at 4 hr, FIG. 3b), while the high concentrations (≥500 mM) produce NPs that grow slowly (e.g., 500 mM NPs are 6.2 nm at 0 hr and 8.9 nm at 4 hrs, FIG. 3b).

More striking is the effect of concentration on RSD: at the conventional concentration (100 mM) the RSD increases from 10% at 0 hr to 18% at 2 hrs (FIG. 3c), but for the concentrations≥500 mM the RSD decreases; particularly for the highly concentrated solution (1000 mM), the RSD decreases from 9.6% at 0 hr to 9.8% at 2 hr (FIG. 3c). Experimental data clearly illustrate that higher precursor concentrations produce small, monodisperse particles that focus in size over extended reaction growth or soak times. The results further suggest that the crossover point for the size-focusing behavior occurs near 500 mM. Notably, the RSD achieved in this synthesis is significantly smaller than in previously reported $Cu_{2-x}S$ NPs (typically >14% RSD). The consistent narrow size distribution of NPs at extended soak times at 185° C. suggests that the colloidal stability of NPs fabricated by the heat-up method is greater than those fabricated by hot injection.

To explain the experimental trends observed in the heat-up synthesis one may hypothesize that the nucleation and growth steps are temporally decoupled. To test this hypothesis, extended was the duration of the low-temperature (50° C.) mixing stage for 4 hr after mixing the precursors together (FIG. 10). Both the conventional and highly concentrated reactions maintained a constant size (~3 nm) and RSD (20% RSD) during the 4 hr, indicating a stable nucleation stage at 50° C., and the successfully the separation of nucleation and growth via the heat-up method.

Beyond the $Cu_{2-x}S$ system, one may demonstrate the general applicability of the highly concentrated heat up method to other materials, namely PbS and CdS. Similar to the Cu$_{2-x}$S system, 1000 mM concentrations of Pb oleate and Cd oleate are mixed with a sulfur source (5000 mM sulfur oleylamine for PbS or 2500 mM tri-octyl phosphine sulfide for CdS). Identical ramp-soak heating profiles as the Cu$_{2-x}$S system is used (ramp up to and maintain at 185° C.). For the PbS NP system, the NP size and RSD of 7.0 nm and 17.5%, respectively, experience slow growth and size-focusing throughout the 4 hour soak (size and RSD at 2 hr is 7.8 nm and 15.1%, respectively, see FIG. 11). Similarly, CdS NP synthesis at high concentrations has restricted growth during the long reaction duration. After 15 min into the soak, the absorbance edge does not shift, demonstrating that particle growth has ceased (see FIG. 12). Furthermore, the full-width half-maximum of the PL for the CdS NP remain constant during the soak (FWHM of PL is 25 nm). The optically determined size and RSD are 4.8 nm and 7%, respectively. This is in close agreement with the measured size and RSD from the TEM image at 0 hr into the soak. The stabilized particle growth of PbS and CdS NPs, as well as the constant RSD, in the highly concentrated heat-up approach exhibit substantial synthesis control, which is essential to the scale-up of these materials.

B. Reproducibility

To characterize batch-to-batch reproducibility, triplicate control experiments were performed for the 100 mM (conventional) and 1000 mM (highly concentrated) systems under otherwise identical synthesis conditions. The average of three replicate reactions is portrayed in FIG. 6 with error bars representing the standard deviation of the size and RSD between the reactions. Replicated reactions for the conventional concentrations produce NP mean size and RSD that have considerable variations between reactions (up to ~15% variability in size and 5% variability in RSD). However, the highly concentrated reactions result in consistent sizes and RSD (<5% variability).

C. Robustness

To characterize the sensitivity (or robustness) of the highly concentrated system to experimental noise factors (e.g. chemical fluctuations), one may perturb the system with various chemical spikes. A 10 vol. % spike of three different chemical solutions: (1) 1000 mM dissolved copper chloride precursor, (2) 1000 mM dissolved elemental sulfur precursor, and (3) ~3.0±1.0 nm Cu$_{2-x}$S seeds (NPs from the 50° C. mixing stage). These experiments consisted of a 1000 mM medium (copper and sulfur precursors) initially mixed at 50° C. that was heated to and maintained at 185° C. for 2 hours. After which, the reaction solution was spiked with one of the three spike solutions. Aliquots of each spike test were taken before the spike at zero minutes (zero is defined as the beginning of the soak phase, when the solution has just reached 185° C.), 60 min, 120 min, and after the spike at 125 min (5 min post spike), 150 min (30 min post spike), 180 min, and 240 min. The size and RSD of NPs for the various spike tests is shown in FIG. 11. The inset to FIG. 4 shows the responses to the three spikes. Notably, the highly concentrated solution is resilient to chemical perturbation, via seeds or copper precursor, and thus less susceptible to batch-to-batch chemical variations.

In context of NP motion through the reaction fluid, the viscosity ($\mu$) can be translated to mass diffusivity (D) using the Stokes-Einstein-Sutherland equation (i.e., $D=k_B T/6\pi\mu r$) for NPs with a hydrodynamic radius, r. Comparing mass transport for concentrated and conventional conditions therefore shows that diffusivity in the highly concentrated condition is approximately five-fold lower, given the differences in viscosity discussed above (FIG. 6b and Table 2). One may therefore conclude that the reduced NP mobility in the concentrated reaction environment contributes significantly to the stability of the size distribution due to decreased NP collision rates (vide infra).

D. Heat Transport

Thermal conductivity and heat capacity can have a significant impact on NP reactions, especially since both factors depend on NP concentration. However, the impact of the thermal properties of the reaction fluid has not received the appropriate consideration in previous studies. One may hypothesize that the higher heat capacity of the highly concentrated system renders it more robust relative to experimental thermal fluctuations. To test this hypothesis one may deliberately perturb the reaction environment (maintained at 185° C.) with a spike of solvent at room temperature. As detailed in the supporting information (FIG. 12) thermal fluctuations due to the spike are less pronounced in the concentrated system compared to those for the conventional conditions. The immediate temperature drop in the highly concentrated reaction is roughly half that of the conventional reaction, indicating that the former has a higher heat capacity and thus a smaller thermal diffusivity. This behavior agrees with the higher heat capacity and lower thermal diffusivity measured for the highly concentrated solution (FIG. 6c-d and Table 2).

E. Growth Mechanism

To better understand the growth mechanism one may examine the precursor conversion rate and growth models on coalescence (or agglomeration) and Ostwald ripening. The precursor conversion is assessed through the dried NP mass, while excluding the mass of organic ligands as determined by TGA (see FIG. 20 for details). At the beginning of the soak stage at 185° C. (time=0 hr), the conversions are near complete for both the conventional and highly concentrated conditions (82% and 88%, respectively); further, both conditions have similar sized NPs (~6 nm). The high conversion values indicate the concentration of remaining active growth species (or residual precursor) is small. Specifically, if all of the residual precursor is considered to be in the form of Cu$_2$S monomer, the approximate residual concentration would be 8 and 50 mM residual Cu$_2$S for the conventional and high concentrated solutions, respectively. In relation to the LaMer model, the fact that the conventional conditions undergo Ostwald ripening (to be discussed, see FIG. 7) suggests that this solution is near the monomer saturation limit (at approx. 8 mM Cu$_2$S monomer) and that the residual monomer is in equilibrium with the monomer attached to NP surface. Thus, the highly concentrated solution, with higher residual monomer concentration (approx. 50 mM), is still supersaturated, and resistant to Ostwald ripening.

To describe the NP size evolution during the soak stage, one may calculate an increase in NP size if all of the residual precursor were to be added as new material to the existing NPs (i.e., 100% conversion). The mean NP size increases by only ~7% for the conventional case (~6 nm to 6.4 nm), and ~4% for the highly concentrated case (~6 nm to 6.3 nm). However, experiments show that the final size for conventional and highly concentrated (14.7 and 7.5 nm, respectively) is much greater than the size predicted by this simple calculation; this comparison indicates that another mechanism beyond monomer addition via unreacted precursor is required to describe the observed NP growth.

In light of the depleted monomer condition, one may infer that the growth mechanism should be Ostwald ripening or NP coalescence, which would be governed by NP mobility or diffusivity rather than concentration gradients. One method to assess the growth process is to plot the time evolution of volume normalized by the final volume. For the conventional concentrations, although the growth in particle size slows as the reaction progresses, the volumetric growth rate remains fairly constant over the duration of the experiment (FIG. 7a, blue points, 100 mM). Linear volumetric growth rate is indicative of Ostwald ripening, as supported by the Lifshitz-Slyozov-Wagner (LSW) theory. Alternatively, a sigmoidal curve describes the highly concentrated condition (FIG. 7a, red points, 1000 mM), suggesting the growth process is through coalescence or monomer addition.

Additionally, LSW theory correlates the volumetric growth rate of NPs to their diffusivity, in which greater particle diffusivity induces faster growth. One may determine the diffusivity of NPs via the Stokes-Einstein-Sutherland relation (vide supra). FIG. 7b shows the diffusivity of the conventional and highly concentrated reaction at various sizes with a constant viscosity. A Gaussian distribution of the experimentally-determined particle size and deviation is overlaid (FIG. 7b, green curve) on these diffusivities and represents the size and standard deviation (SD) of both concentrations at the beginning of the soak. Interestingly, the conventional reaction has a five-fold greater diffusivity compared to the highly concentrated reaction, at the beginning of the soak. Furthermore, the variation in particle diffusivity for an identical NP size distribution is five-fold larger in the conventional reaction. For instance, a 3-$\sigma$ (3-SD) particle spread (99.7% of total particles) corresponds to variation or disparity in diffusivity of $4.55 \times 10^{-11}$ $m^2 s^{-1}$ for the conventional reaction; whereas the highly concentrated reaction only varies in diffusivity by $9.70 \times 10^{-12}$ $m^2 s^{-1}$ for the same NP size distribution. The higher diffusivities coupled with a larger variation in diffusivity over the particle distribution provide mechanistic insight into not only the faster particle growth of the conventional reaction, but also for its observed increase in RSD (FIG. 3 and FIG. 7a). Moreover, as the soak time increases and the NPs in the conventional condition grow in size, their diffusivity and variation in diffusivity decrease, resulting in slower growth and a constant but large SD (FIG. 3 and FIG. 7b).

One may investigate various growth models to describe the growth process for each concentration. Each model represents the data to a moderate degree of accuracy (see Table 4 for $R^2$ values). A model proposed by Huang et al. suggests a two-term, three-fitting parameter model, in which the first fitting parameter ($k_1$) describes orientated attachment (OA) and captures the initial sigmoidal growth behavior and the second fitting parameter ($k_2$) describes Ostwald ripening (OR) (FIG. 21). The third parameter (n) is an arbitrary constant that scales the time dependence on Ostwald ripening. The fits for this model generally follow the suspected trends from our data: $k_2$ (OR) dominates at lower concentrations, whereas $k_1$ (OA) dominates in the highly concentrated case. Additionally, the calculated $R^2$ values are near unity for each concentration, which suggests the fits are accurate. However, the trends begin to deviate from the experimental data at the longer soak times (see FIG. 21).

Kinetic growth profiles of NPs can also be described by the Kolmogorov-Johnson-Mehl-Avrami (KJMA) model, (FIG. 22) which requires the normalization of the NP volumes, such that the bounds of the expression are between 0 and 1. Unlike the Huang model, this is a two-parameter fitting model that does not describe Ostwald ripening, but rather only aggregative NP growth ($k_g$) or coalescence. The growth rate increases with concentration, suggesting coalescence is as the dominant process at high concentrations, which agrees with the oriented attachment rate of the Huang model (see FIG. 22). Lastly, one may analyze NP growth in context of the four-step NP agglomeration described by Finney et al. Briefly, this model describes the evolution of particle size in context of rates for bimolecular agglomeration ($k_3$) and autocatalytic agglomeration ($k_4$). This agglomeration (or coalescence) model provides a good fit to the experimentally observed particle size evolution shown in FIG. 3 (see FIG. 23). Notably, this analysis shows $k_4 > k_3$ at conventional concentrations, and a transition to $k_4 < k_3$ at high concentrations (see FIG. 23). This model indicates that conventional concentrations are dominated by autocatalytic agglomeration or Ostwald ripening whereas at high concentrations, the NP synthesis is dominated by bimolecular agglomeration or coalescence. Importantly, the reduced overall agglomeration can be explained by two key experimental trends discussed above, namely: (1) higher residual precursor concentration stabilizes the NP surface and thereby reduces the energetic driving force for agglomeration and (2) the rate of NP collisions per particle is reduced in the high viscosity of the synthesis environment increases. Ultimately, these growth models each suggest the same conclusion: conventional conditions grow via Ostwald ripening, and as the concentration increases Ostwald ripening is suppressed. Further, the models indicate the growth mechanism for high concentration is via coalescence.

To determine the magnitude of growth by coalescence, one may compare the theoretical evolution in size distribution for NPs undergoing coalescence to our experimentally measured size distributions. Specifically, as an analogy to polymerization chemistry, two theoretical types of coalescence processes are considered: step coalescence and living coalescence. Step coalescence means that each particle must coalesce once before any particle can coalesce twice (or again). This would allow the NPs in solution to follow similar growth trajectories and enables the NPs to equilibrate before the next coalescence step, thereby reducing the RSD (FIG. 7c, gray curves). On the other hand, living coalescence means some particles may experience multiple coalescence events while others experience none. Hence, each particle experiences different growth trajectories, which consequently increase the RSD (FIG. 7d, gray curves). Conceptually, living coalescence dominates when the probability of NP collisions is high, favoring multiple coalescence events involving the same particle. In contrast, step coalescence dominates when the probability that a particle experiences multiple coalescence events for a given time is low. FIG. 7c to FIG. 7d illustrates the theoretical evolution of both step and living coalescence processes compared to our experimental data. Each shift in theoretical size distribution (e.g., I→II→III, gray curves) represents the system after the number of particles has been cut in half (e.g., condition II has half the particles of condition I, and III half that of II, see additional details below). For step coalescence, this means each particle experiences one coalescence event between I and II while for living coalescence each particle may experience a range of coalescence events. Thus, each NP involved in step coalescence follows a consistent reaction profile or experiences the same number of coalescence events, which promotes a uniform size distribution. The opposite is true for living coalescence. Comparing our data to these theoretical distributions suggests that conventional conditions are better described by living coalescence, whereas high concentrations are better described by step coalescence (see FIG. 7c to FIG. 7d).

Physically, the larger NP mass diffusivities for the conventional reactions enable some NPs to experience multiple coalescence events while other NPs in the system experience few or none, promoting a range of NP growth trajectories and increasing RSD. In contrast, NPs in high concentration reactions diffuse more slowly, experience fewer and similar numbers of coalescence events, and thus remain monodisperse. This physical insight agrees with the relative collision rate for NPs in solution. Specifically, the total collision rates are similar for both conventional and highly concentrated conditions (see Table 3) since the order-of-magnitude higher diffusivity in the former is offset by the order-of-magnitude lower NP concentration. Yet, the relative collision rate (or the fraction of particles that collide, i.e. the ratio of collision rate to the total number of particles) is near a factor of 6 higher for the conventional compared to the highly concentrated condition (see Table 3). The greater number of NPs undergoing coalescence events for conventional condition supports the living coalescence process dominated by multiple coalescence events. In contrast, fewer NPs are involved in coalescence events for the high concentrations, promoting a step coalescence mechanism, more consistent reaction profiles per particle, and thus more uniform size distribution.

III. Conclusion

The embodiments illustrate that by concentrating precursor solutions near the solubility limit it becomes possible to separate precursor mixing and NP growth, and reproducibly achieve monodisperse NPs with a heat-up method. Within this new highly concentrated and viscous regime, synthesis parameters become less sensitive to experimental variability and thereby provide a reproducible and robust NP synthesis methodology. One may demonstrate the intrinsic robustness of the method by showing that the NP synthesis is insensitive to chemical spikes (copper chloride and $Cu_{2-x}S$ seeds), which agree with equivalent shift in the initial precursor ratios. Encouraged by the high degree of reproducibility and robustness of the highly concentrated reaction regime, one may successfully scale the reaction two orders of magnitude in volume to 2.5 L; all while maintaining a NP size and RSD similar to that observed on the lab scale. Importantly, the scale-up to a 215 g NP batch was accomplished with an unprecedented yield of 86 grams per liter of reaction volume. Further, this method can be successfully adapted to other metal sulfides such as CdS and PbS. Advances in the robust scale-up of colloidal NP synthesis derive from improved understanding of the interplay between chemical, thermal and rheological properties on basic nucleation and growth. One may point to the heat-up method under highly concentrated reaction environments as a promising NP synthesis methodology with significant potential to resolve outstanding challenges in producing NP materials at scales and capable of meeting their emerging demand.

IV. Experimental Methods

1. Materials

The following chemicals were used as received: oleylamine (OLA, 98% primary amines), 1-octadecene (ODE, 90%), oleic acid (OA, 90%), copper(I) chloride (97%), cadmium oxide (99.5%), lead (II) oxide (99.0%), and elemental sulfur (purified by sublimation, particle size-100 mesh) were purchased from Sigma-Aldrich. Hexane (BDH ACS Grade) and ethanol (Ethanol, 200 proof, Anhydrous KOPTEC USP) were purchased from VMR International. Tri-n-octylphsosphine (TOP, 97%) was purchased from Strem Chemicals.

2A. Synthesis of $Cu_{2-x}S$ Nanoparticles

Sulfur oleylamine (S:OLA) was reacted with dissolved CuCl (2:1 molar ratio) to synthesize $Cu_{2-x}S$ nanocrystal. In a three-necked flask with a condenser and stir bar, CuCl was mixed with solvent (70%/30% oleylamine/1-octadecene) (OLA/ODE) to a specific concentration (0.1-1.0 M). The solution was degassed under vacuum and heated to and held at 110° C. for 1 hr to dissolve, and then cooled to 50° C. and placed under nitrogen. The solution was considered dissolved when it had turned a transparent tan or copper color, which was darker for higher concentrations. For the sulfur, in a three-necked flask with a condenser and stir bar, a specified concentration of sulfur (0.5-5 M) was prepared in solvent (70%/30% oleylamine/1-octadecene). The sulfur concentration was always 5 times that of the copper solution. The sulfur solution was degassed at room temperature and then place under $N_2$ and heated to 110° C. for 1 hr to dissolve the sulfur. As the yellow sulfur particulates dissolved, the solution turned dark red and no particulate were visible. The solution was considered dissolved when the solution is a uniform dark red color. The sulfur solution is then cooled to room temperature. The viscosity of both solutions substantially rises as they cool, but do not solidify. If the copper solution is cooled too quickly (forced convection), it will solidify.

At 50° C., 1 mL of the S:OLA solution was injected into the copper solution, and the solution immediately turned black. The reaction was heated following a specified time-temperature profile and then quenched in cool water. During the quench, when the reaction reaches 100° C., the reaction is injected with equal parts (to the reaction volume) of hexane or ethanol to further enhance cooling and prevent solidification of reaction media. The $Cu_{2-x}S$ NPs were purified by precipitating in ethanol, centrifuging (7 min at 4400 rpm) and redispersed in hexane via sonication. This purification process was repeated again before TEM, and a third time before XRD, samples were prepared. The typical temperature profile was a 5 min hold at 50° C. after injection to mix, then ramped to 185° C. at a rate of 6.75° C./min (20 min ramp). Upon reaching 185° C., the reaction solution was maintained at 185° C. for 1-4 hours.

2B. Synthesis of CdS Nanoparticles

Tri-octylphospine sulfide (TOPS) was reacted with CdOleate (1:1 molar ratio) to synthesize CdS nanoparticles. In a three-necked flask with a condenser and stir bar, 10 mmol of CdO was mixed in 10 mL of oleic acid (OA) and degassed under vacuum. The mixture bubbles vigorously and becomes frothy. While maintaining froth level, the mixture was heated to and held at 110° C. for 30 min, while still under vacuum. During this time, the mixture became transparent and the bubbling subsided. The solution was further heated to 160° C. and remained at 160° C. until the additional bubbling subsided, after which the solution was cooled to 50° C. and placed under $N_2$. During cooling, the viscosity of the solution substantially raised and became a gel at 50° C. In a $N_2$ glovebox, a 2.5 M TOPS solution was prepared by dissolving 0.4 g (12.5 mmol) of elemental sulfur in 5 mL (4.16 g) of TOP at room temperature in a 20 mL disposable glass vial. The solution was considered dissolved when there are no residual sulfur particulates.

The TOPS solution was removed from the glovebox and placed inside the fumehood. Via a syringe, 4 mL of the TOPS solution was extracted from vial and injected into the 50° C. CdOleate solution. The same heating profile, quenching, and cleaning procedures as the $Cu_{2-x}S$ synthesis were used.

2C. Synthesis of PbS Nanoparticles

S:OLA was reacted with PbOleate (1:1 molar ratio) to synthesize PbS nanoparticles. In a three-necked flask with a condenser and stir bar, 10 mmol of PbO was mixed in 10 mL of oleic acid (OA) and degassed under vacuum. The mixture bubbled vigorously and became frothy. While maintaining froth level, the mixture was heated to and held at 110° C. for 30 min, while still under vacuum. During this time, the mixture became transparent and the bubbling subsided. The solution was further heated to 160° C. and remained at 160°

C. until the additional bubbling subsided, after which the solution was cooled to 50° C. and placed under $N_2$. During cooling, the viscosity of the solution substantially increased and became a gel at 50° C. Similar to the $Cu_{2-x}S$ nanoparticles, a 5.0 M S:OLA solution was prepared by dissolving 0.8 g (25 mmol) of elemental sulfur in 5 mL of OLA/ODE mixture. The solution was degassed at room temperature and then placed under $N_2$ and heated to 110° C. for 1 hr to dissolve the sulfur. The solution was considered dissolved when the solution was a uniform dark red color. The sulfur solution is then cooled to room temperature.

2 mL of the S:OLA was injected into the PbOleate solution at 50° C. The solution was initially two phase, but became a homogenous black color over the 5 min of mixing at 50° C. The same heating profile, quenching, and cleaning procedures as the $Cu_{2-x}S$ synthesis were used.

V. Characterization Techniques

1. Transmission electron microscopy (TEM) analysis was performed on an FEI Tecnai T12 transmission electron microscope operating at 120 kV with a $LaB_6$ tip. Samples for TEM analysis were prepared by placing a drop of NP solution in hexane on top of a copper grid coated with an amorphous carbon film. Particle counting was done manually using ImageJ (0.33 nm/pixel resolution). A 100 nanoparticle count was used to measure average size and relative size distribution.

2. X-ray powder diffraction (XRD) data were collected on a Scintag Theta-Theta X-ray diffractometer (Cu Kα radiation, ~1.54 Å). Samples were washed with ethanol, centrifuged, and resuspend in hexane three times. After the three wash, the samples were dried overnight before XRD analysis.

3. Viscosity measurements were performed on an Anton Paar Physica MCR 501 rheometer using a 5-cm parallel plate and gap of 0.05 mm. For viscosity measurements, raw samples were extracted from the reaction at 50° C., and cooled to room temperature before being placed in the rheometer. The samples were sheared at $10 \, s^{-1}$ while heating from 25° C. to 185° C. at 5° C./min. Above 120° C. vapor loss begins to be significant impairing the reliability of the data.

4. Dynamic light scattering (DLS) were performed on Zetasizer Nano-ZS (Malvern Instruments Inc), and a Dip Cell (ZEN1002) was used for zeta-potential measurement. Huckel theory was used to evaluate the zeta-potential. Sample solutions were prepared similar to those used for TEM analysis. The purified solution was diluted in hexane to the order of 1-10 mg/mL, which provide a colored transparent solution for analysis. A 2 min equilibration time was used for each measurement and three replicates were taken.

5. Heat capacity measurements were completed on DSC Q2000 (TA Instruments Inc.). Samples were prepared in similar method as for viscosity measurements. The samples were cooled initial to −180 before a run started. Then, heated from 0 to 185° C. of 5-10° C./min. The sample losses mass during the run, so value above 120° C. (similar to viscosity measurements) should not be considered reliable.

6. Thermogravimetric analysis was performed on EXSTAR SII TG/DTA 6200 (Seiko Instruments Inc.) or TGA Q500 (TA Instruments Inc.). Samples were prepared similar to those for XRD. The following temperature profile was used 10° C./min ramp from 25° C. to 600° C., and hold at 600° C. for ~10 min.

7. UV-Vis-NIR absorption measurements were performed on Cary 5000 UV-Vis-NIR (Aligent Technologies). Samples were suspended in hexane or TCE.

8. Photoluminescence (PL) measurements were performed on Horiba Fluoromax 4. Samples were suspended in hexane or TCE with an excitation source of 350 nm and a slit of 3 nm.

VI. Tabular Data

TABLE 1

Survey of Conventional Concentrations for NP Synthesis with specific precursors and solvents. Notably, metal concentrations are typically ≤100 mM, and 400-1000 mM chalcogen.

| Chemistry | Metal Precursors | Chalcogen Precursors | Solvent | Metal Conc.(mM) | Chalcogen Conc. (mM) | Ref |
|---|---|---|---|---|---|---|
| CdSe | Cadmium myristate | Se | ODE | 16 | 8 | 1 |
| Cu2S | Cu(acac)2 | S | Oleylamine | 20 | 10 | 2 |
| CdS | Cd(tetradecanoate) | N-n-hexyl-N',N'-di-n-butylthiourea | hexadecane/diphenylether | 25 | 400 | 3 |
| ZnS | Zn(OA)2 | Thiourea | octadecene/tetraglyme | 32 | 400 | 3 |
| CdSe | Cd(OA)2 | Se | OLA/ODE, TOP | 40 | 1020 | 4 |
| Cu2S | Cu(acac)2 | S | Oleylamine | 50 | 25 | 5 |
| Cu2S | Cu(acac)2 | Thiourea | ODE/OLA/diphenyl ether | 84 | 1000 | 3 |
| PbS | Pb(OA)2 | N-dodecyl-N'-phenylthiourea | Octane | 155 | 3052 | 3 |
| CdS | CdCl2 | S | OLA | 100 | 150 | 6 |
| CdS | CdCl2 | S | OLA | 100 | 1200 | 6 |
| ZnS | ZnCl2 | S | OLA/TOPO (10 mL, 2.3 g) | 159 | 2400 | 6 |
| PbS | PbCl2 | S | OLA | 200 | 332 | 6 |
| MnS | MnCl2 | S | OLA | 200 | 400 | 6 |

TABLE 2

Thermal and physical properties of NP solutions and the mixed suspending solvents[a]

| | Melting Point (° C.) | Volumetric Heat Capacity (J/m³ · ° C.) at 50° C.[a] | Thermal Diffusivity[b] (m²/s) at 50° C. | Shear Viscosity (mPa · s) at 120° C. | Mass Diffusivity[c] (m²/s) at 120° C. |
|---|---|---|---|---|---|
| 1000 mM | ~40 | $3.7 \cdot 10^6$ | $4.0 \cdot 10^{-8}$ | 3.8 | $2.8 \cdot 10^{-11}$ |
| 500 mM | — | — | — | 2.5 | $2.1 \cdot 10^{-11}$ |
| 100 mM | ~30 | $2.2 \cdot 10^6$ | $5.7 \cdot 10^{-8}$ | 0.81 | $13.0 \cdot 10^{-11}$ |
| 70%/30% OLA/ODE | 14-16 ODE[d] 18-26 OLA[d] | $1.3 \cdot 10^6$ | $11.4 \cdot 10^{-8}$ | 0.77 | $33.0 \cdot 10^{-11e}$ |

[a]See FIG. 19 for measurement details, and value was converted to volumetric value using mass-averaged density (solvent = 0.813 g/cm³; $Cu_{2-x}S$ = 5.6 g/cm³; 100 mM has 1 wt % fraction and 1000 mM has 10 wt % based on theoretical yield),
[b]Thermal diffusivity calculated based on specific heat capacity, mass-averaged density, and an approximate thermal conductivity value (0.13 W/m) (for reference, values for salts and engine oil are ~0.25 and ~0.13 W/(m K), respectively[7-9]),
[c]Calculated from Stokes-Einstein assuming particle size of 5.5 nm,
[d]Literature values from Sigma-Aldrich,
[e]Calculated from Stokes-Einstein, assuming a particle size corresponding to oleylamine's length (2.3 nm). This value is on the same order as self-diffusivity determined from a previously published NMR study[10].

TABLE 3

Comparison of solution conditions between conventional (100 mM) and highly concentrated (1000 mM)

| Concentration | Yield (%) | Particle Concentration (NP/L) | Unreacted precursor Concentration (mM) | Inter-particle spacing (nm)[a] | NP Diameters between particles[b] | Smoluchowski Collision Frequency[11] or Rate[d] (NP/s) | Relative Collision Rate (1/s) |
|---|---|---|---|---|---|---|---|
| 100 mM | 82 | $10^{19}$ | 8.5 | 58 | 5.5 | $1.37 \times 10^5$ | $1.37 \times 10^{-14}$ |
| 1000 mM | 88 | $10^{20}$ | 53 | 27 | 2.5 | $2.5 \times 10^5$ | $2.5 \times 10^{-15}$ |
| Superlattice[c] | — | $10^{21}$ | — | 10.6 | ~1 | — | — |

[a]Including ligands (6 nm NP core; 2.3 oleylamine ligand = 10.6 nm NP). Mean interparticle spacing calculated from r = (3/(4*π*n))^(1/3) where r is the mean interparticle distance and n is the number of particles per volume.
[b]Inter-particle spacing divided by the 10.6 nm NP diameter with ligands.
[c]For FCC close-pack, particle concentration is determined as 4 NP/unit cell, and the unit cell length is $a = \frac{2d}{\sqrt{2}}$.
[d]Collision frequency is based on a Smoluchowski collision equation (see sample calculations for additional details).

TABLE 4

Comparison of R² values for the fitted supporting FIGS. 21, 22 and 23

| Concentration | FIG. S14[a] Huang model[12] | FIG. S15[b] KJMA model[13] | FIG. S16[c] Finney model[14] |
|---|---|---|---|
| 100 mM | 0.9634 | 0.9794 | 0.9902 |
| 300 mM | 0.9514 | 0.9652 | 0.9807 |
| 500 mM | 0.9636 | 0.9981 | 0.9433 |
| 750 mM | 0.8856 | 0.9689 | 0.8432 |
| 1000 mM | 0.9768 | 0.9886 | 0.9868 |

[a]R² values for each concentration to the model proposed by Huang et al[12].
[b]R² values for each concentration to the KJMA model[13,15].
[c]R² values for each concentration to the model proposed by Finney et al[14,15].

VII. Sample Calculations

Stokes-Einstein-Sutherland Relation of Viscosity and Diffusivity

D is mass diffusivity, $k_b$ is Boltzmann's constant, T is temperature, $\eta$ is shear viscosity, and r is the NP diameter $$\text{Mass Diffusivity} = D = \frac{k_B T}{6\pi \eta r}$$

$$D = \frac{1.38 \cdot 10^{-23} \frac{J}{K}(120 + 273.15)K}{6\pi \cdot 0.0038 \text{ mPa} \cdot \text{s} \cdot 5.5 \cdot 10^{-9} \text{m}} = 2.8 \cdot 10^{-11} \frac{m^2}{s}$$

Thermal Diffusivity k is the thermal conductivity, $\rho$ is mass-average density, and $C_p$ is the specific heat. We assumed a constant thermal conductivity for all concentration. The thermal conductivity for salts and oils are equivalent and therefore different mass fractions do not alter the value much.

$$\text{Thermal Diffusivity} = \alpha = \frac{k}{\rho C_p}$$

$$\alpha = \frac{0.13 \frac{W}{m \cdot K}}{2.9 \frac{J}{m \cdot K}\left(0.9 \cdot 813 \frac{\text{kg}}{m^3} + 0.1 \cdot 5600 \text{ kg/m}^3\right)} = 5.2 \cdot 10^{-8} m^2/s.$$

Molar Concentration of Particles

[P] is concentration of $Cu_2S$ at full conversion, MW is the molecular weight f $Cu_2S$, $\rho$ is the density, $V_p$ is the particle volume at the beginning of the soak, and $N_A$ is Avogadro's Number.

$$\text{Particle Concentration} = [B] = \frac{[P]MW_{Cu_2S}}{\rho V_p N_A}$$

$$[B] = \frac{0.5 \frac{\text{mol}}{\text{L}} \cdot 159.2 \frac{\text{g}}{\text{mol}}}{5600 \frac{\text{g}}{\text{L}} \cdot 125 \frac{\text{nm}^3}{\#} \times 10^{-24} \frac{\text{L}}{\text{nm}^3} \cdot 6.022 \times 10^{23} \frac{\#}{\text{mol}}} =$$

188 µM of Particles

Smoluchowski Collision Frequency[11]

R is the diameter of the NP, D is the diffusivity of the particle, and [B] is the concentration of particles in #/volume. Values for other concentrations are provided in Table S2

$$\text{Collision Frequency} = Z = 4\pi RD[B]$$

$$Z = 4\pi \cdot 6.2 \times 10^{-9} \text{nm} \cdot 2.8 \cdot 10^{-11} \frac{\text{m}^2}{\text{s}} \cdot 1.1 \times 10^{23} \frac{\#}{\text{m}^3} = 2.5 \times 10^5 \frac{\#}{\text{s}}$$

Yield Calculations $$\text{Theoretical Yield} = \frac{m_{CuCl}}{M_{wCuCl}} \cdot M_{wCu_2S} \cdot v$$

where $m_{CuCl}$ is the initial is mass of CuCl, $M_{wCuCl}$ and $M_{wCu_2S}$ are the respective molecular weights for CuCl and $Cu_2S$, respectively, and v is the molar ratio of $Cu_2S$ to CuCl.

$$\text{Theoretical Yield} = \frac{1 \text{ g}}{98.999 \frac{\text{g}}{\text{mol}}} \cdot 159.16 \frac{\text{g}}{\text{mol}} \cdot \frac{1 \text{ mol } Cu_2S}{2 \text{ mol CuCl}} = 0.803 \text{ g}$$

$$\text{Yield Percent} = \frac{\text{Collected Mass} \cdot (100 - \text{wt \% ligand})}{\text{Theoretical Yield}}$$

$$\text{Yield Percent} = \frac{08644 \text{ g} \cdot (100 - 17.8\%)}{0.803 \text{ g}} = 88\%$$

Residual Precursor Calculation Equations

Residual Precursor Mass =

Theoretical Yield − Collected Mass · (100 − wt % ligand)/100

$$\text{Residual Precursor Concentration} = \frac{\text{Residual Precursor Mass}}{\text{Solution Volume} \cdot M_{wCu_2S}}$$

The change in volume by adding residual precursor mass to existing particles is $$\text{Change on Volume} = \text{Vol}_{part} \cdot \left(\frac{1}{\text{Yield Percent}/100} - 1\right)$$

NP Diameter at 100% conversion =

$$2\left(\frac{\text{Change in Volume} \cdot 3}{4\pi} + \text{Initial } NP \text{ radius}^3\right)^{\frac{1}{3}}$$

Calculation

Residual Precursor = 0.803 g − 0.8644 g · (100 − 17.8%)/100 = 0.093 g $$\text{Residual Precursor Concentration} = \frac{0.093 \text{ g}}{0.011 \text{ mL} \cdot 159.16 \frac{\text{g}}{\text{mol}}} = 53 \text{ mM}$$

Using initial NP diameter of 6 nm and 88% yield, $$\text{Change in Volume} = \frac{4}{3}\pi \left(\frac{6 \text{ nm}}{2}\right)^3 \cdot \left(\frac{1}{\frac{88}{100}} - 1\right) = 15.4 \text{ nm}^3$$

NP Diameter at 100% conversion =

$$2\left(\frac{15.4 \text{ nm}^3 \cdot 3}{4\pi} + (3 \text{ mm})^3\right)^{\frac{1}{3}} = 6.3 \text{ nm}$$

Step and Living Coalescence Models

The theoretical distributions for the step and living coalescence models shown in FIG. 7 were obtained simulating the coalescence of initial size distribution at t=0 hr (~6 nm; RSD=10%). An initial particle distribution was generated using the NP size and standard deviation at the beginning of the soak for the conventional and highly concentrated conditions. Then, NP were randomly selected and combined by a volume sum. The new particle size was then computed and the total particle count was reduced by one per combination event. In the case of step coalescence, a selected particle was rejected if it has already coalesced, and another particle that has not coalesced was selected. This process was repeated until every particle was coalesced. Then, this process began again for the next distribution shift (I, II, III, etc.). Each distribution shift (e.g., curve I to II) corresponded to the point when the number of particles had been cut in half. For the case of living coalescence, the process was similar, except particles were not rejected if they have already coalesce (and not all particles will coalesce), and the particles are allowed to coalesce again. For step coalescence, this meant each particle experienced one coalescence event between I and II while for living coalescence each particle may have undergone a range of coalescence events (from none too many).

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the embodiment (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments and does not impose a limitation on the scope of the embodiment unless otherwise claimed.

No language in the specification should be construed as indicating any non-claimed element as essential to the practice of the embodiment.

It will be apparent to those skilled in the art that various modifications and variations can be made to the present embodiment without departing from the spirit and scope of the embodiment. There is no intention to limit the embodiment to the specific form or forms disclosed, but on the contrary, the intention is to cover all modifications, alternative constructions, and equivalents falling within the spirit and scope of the embodiment, as defined in the appended claims. Thus, it is intended that the present embodiment cover the modifications and variations of this embodiment provided they come within the scope of the appended claims and their equivalents.

What is claimed is:

1. A nanoparticle synthesis method comprising:
   mixing together at a first temperature at least:
      a first reactant material at a first concentration; and
      a second reactant material at a second concentration, to provide a reactant composition,
   wherein the first reactant material is present at 50% or greater of the saturation limit of the first reactant material and/or the second reactant material is present at 50% or greater of the saturation limit of the second reactant material;
   thermally adjusting the reactant composition to a second temperature to provide a nucleated virgin nanoparticle population within a nucleated reactant composition; and
   thermally soaking the nucleated virgin nanoparticle population in the nucleated reactant composition to provide a substantially monodisperse nanoparticle population.

2. The method of claim 1 wherein the nanoparticle synthesis method comprises a batch nanoparticle synthesis method.

3. The method of claim 1 wherein the nanoparticle synthesis method comprises a continuous nanoparticle synthesis method.

4. The method of claim 1 wherein the substantially monodisperse nanoparticle population comprises a material selected from the group consisting of metal carbide materials, metal nitride materials and metal oxide materials.

5. The method of claim 1 wherein the reactant composition also comprises a diluent.

6. The method of claim 1 wherein the thermally soaking of the nucleated virgin nanoparticle population is undertaken at a thermal soak temperature less than the second temperature.

7. The method of claim 1 wherein the thermally soaking of the nucleated virgin nanoparticle population is undertaken at a thermal soak temperature equal to the second temperature.

8. The method of claim 1 wherein the thermally soaking of the nucleated virgin nanoparticle population is undertaken at a thermal soak temperature greater than the second temperature.

9. The method of claim 1 wherein the first temperature is less than the second temperature.

10. The method of claim 1 wherein the first temperature is equal to the second temperature.

11. The method of claim 1 wherein the first temperature is greater than the second temperature.

12. The method of claim 1 wherein the second concentration is different than the first concentration.

13. The method of claim 1 wherein at least one of the first concentration and the second concentration is at least about 70 percent of a saturation limit of the at least one of the first reactant material and the second reactant material within the reactant composition.

14. The method of claim 1 wherein:
   one of the first concentration and the second concentration is at least about 1000 mM; and
   the other of the first concentration and the second concentration is at least about 100 mM.

15. The method of claim 1 wherein the first temperature is at or above the melting point of at least one of the reactant materials.

16. The method of claim 1 wherein the first temperature is below the nanoparticle nucleation temperature.

17. The method of claim 1 wherein the second temperature is at or above the nucleation temperature.

18. The method of claim 1 wherein the reactant composition at the first temperature has a first viscosity of 0.01 to 1 poise, and
   wherein the reactant composition at the second temperature has a second viscosity of 1 to 100 poise.

19. The nanoparticle synthesis method of claim 1 wherein prior to the mixing together of the first reactant material and the second reactant material the first reactant material and/or second reactant material are present as solutions.

20. A metal chalcogenide nanoparticle synthesis method comprising:
   mixing together at a first temperature at least:
      a first metal reactant material at a first concentration; and
      a second chalcogen reactant material at a second concentration, to provide a metal-chalcogen reactant composition,
   wherein the first metal reactant material is present at 50% or greater of the saturation limit of the first metal reactant material and/or the second chalcogen reactant material is present at 50% or greater of the saturation limit of the second chalcogen reactant material;
   thermally adjusting the metal-chalcogen reactant composition to a second temperature to provide a nucleated virgin metal chalcogenide nanoparticle population within a nucleated metal-chalcogenide reactant composition; and
   thermally soaking the nucleated virgin metal chalcogenide nanoparticle population in the nucleated metal-chalcogen reactant composition to provide a substantially monodisperse metal chalcogenide nanoparticle population.

21. The method of claim 20 wherein the metal-chalcogen reactant composition also comprises a diluent.

22. The method of claim 20 wherein the metal chalcogenide nanoparticle population comprises:
- a least one metal reactant material selected from the group consisting of copper, lead, cadmium, indium and zinc; and
- a least one chalcogen reactant material selected from the group consisting of selenium and tellurium.

23. The method of claim 20 wherein:
- one of the first concentration and the second concentration is at least about 1000 mM; and
- the other of the first concentration and the second concentration is at least about 100 mM.

24. The method of claim 20 wherein the reactant composition at the first temperature has a first viscosity of 0.01 to 1 poise, and
- wherein the reactant composition at the second temperature has a second viscosity of 1 to 100 poise.

25. A metal sulfide nanoparticle synthesis method comprising:
- mixing together at a first temperature at least:
  - a first metal reactant material at a first concentration; and
  - a second sulfur reactant material at a second concentration, to provide a metal-sulfur reactant composition,
- wherein the first metal reactant material is present at 50% or greater of the saturation limit of the first metal reactant material and/or the second sulfur reactant material is present at 50% or greater of the saturation limit of the second sulfur reactant material;
- thermally adjusting the metal-sulfur reactant composition to a second temperature to provide a nucleated virgin metal sulfide nanoparticle population within a nucleated metal-sulfur reactant composition; and
- thermally soaking the nucleated virgin metal sulfide nanoparticle population in the nucleated metal-sulfur composition to provide a substantially monodisperse metal sulfide nanoparticle population.

26. The method of claim 25 wherein the metal-sulfur reactant composition also comprises a diluent.

27. The method of claim 25 wherein the metal sulfide nanoparticle population comprises:
- at least one metal reactant material selected from the group consisting of copper, lead, cadmium, indium and zinc; and
- a sulfur reactant material comprising ammonium sulfide.

28. The method of claim 25 wherein:
- one of the first concentration and the second concentration is at least about 1000 mM; and
- the other of the first concentration and the second concentration is at least about 100 mM.

29. The method of claim 25 wherein the reactant composition at the first temperature has a first viscosity of 0.01 to 1 poise, and
- wherein the reactant composition at the second temperature has a second viscosity of 1 to 100 poise.

* * * * *